United States Patent [19]

Claasen et al.

[11] 4,131,764

[45] Dec. 26, 1978

[54] ARRANGEMENT FOR CONVERTING DISCRETE SIGNALS INTO A DISCRETE SINGLE-SIDEBAND FREQUENCY DIVISION-MULTIPLEX-SIGNAL AND VICE VERSA

[75] Inventors: Theodoor A. C. M. Claasen; Wolfgang F. G. Mecklenbräuker, both of Eindhoven, Netherlands

[73] Assignee: U.S. Philips Corporation, New York, N.Y.

[21] Appl. No.: 821,652

[22] Filed: Aug. 4, 1977

[30] Foreign Application Priority Data

Apr. 4, 1977 [NL] Netherlands .......................... 7703633

[51] Int. Cl.² .............................................. H04J 1/00
[52] U.S. Cl. .................................. 179/15 FS; 364/726
[58] Field of Search .................... 179/15 FD, 15 FS; 325/41, 42, 65; 235/152; 364/726

[56] References Cited

U.S. PATENT DOCUMENTS

| 3,605,019 | 9/1971 | Cutter | 325/65 |
|---|---|---|---|
| 3,676,598 | 7/1972 | Kurth | 179/15 FD |
| 3,891,803 | 6/1975 | Daguet | 179/15 FS |
| 3,971,922 | 7/1976 | Bellanger | 325/42 |

Primary Examiner—Kathleen H. Claffy
Assistant Examiner—Joseph A. Popek
Attorney, Agent, or Firm—Thomas A. Briody; William J. Streeter; Henry I. Steckler

[57] ABSTRACT

A multiplex system has an inverse Fourier transformer that is unequal to its forward one, therefore an optimum distribution of elements is possible.

14 Claims, 54 Drawing Figures

ARRANGEMENT FOR CONVERTING DISCRETE SIGNALS INTO A DISCRETE SINGLE-SIDEBAND FREQUENCY DIVISION-MULTIPLEX-SIGNAL AND VICE VERSA

A. BACKGROUND OF THE INVENTION

A(1) Field of the Invention

The invention relates to a discrete single-sideband frequency-division-multiplex arrangement as well as to a demultiplex-arrangement.

In a frequency-division-multiplex arrangement a plurality of baseband signals is processed such that they can be transmitted simultaneously in a given frequency band. Hereinafter this frequency band will be called "FDM-band". This FDM-band comprises a plurality of non-overlapping subbands. By means of some modulation process or another the frequency band of such a base band signal is shifted to a subband which is characteristic for the relevant baseband signal. The signals in the successive subbands are called channel signals. The signal in the FDM-band which is constituted by all channel signals will, as usual, be called "FDM-signal".

A known modulation process is amplitude modulation. However, amplitude modulation is not economical. For, with amplitude modulation, both sidebands of the modulated signal are transmitted.

The bandwidth required for transmitting an amplitude-modulated signal therefor is twice as large as the bandwidth which is required for the transmission of only one side-band.

As the communication density in a telecommunication system was increased, that is to say as more baseband signals had to be transmitted, it was desired to use the available FDM-band more efficiently. As a result thereof a modulation process designated as single-sideband modulation was used more and more where only one sideband, as the name implies, is transmitted. By using single-sideband modulation twice as many channel signals can be transmitted in the given FDM-band as with amplitude modulation. It is true that with single-sideband modulation an efficient manner of transmission has been realized in terms of required bandwidth, but the manner in which the single-sideband FDM-signal is generated must be made as simple and economic as is technologically possible. Particular is this true when a large number of baseband signals must be converted into a single-sideband FDM-signal.

If a frequency division multiplex arrangement is used at the transmitter side of a telecommunication system, a device must be used at its receiver end for converting the FDM-signal into the individual channel signals, and these channel signals must again be reconverted into the original baseband signals. Such a device may be called frequency-division-demultiplex arrangement. Also in this arrangement, the conversion of the FDM-signal into the original baseband signals must be as simple and economic as is technologically possible.

A(2) Description of the Prior Art

For the conversion of analog baseband signals $x_k(t)$ into an analog FDM signal $y(t)$, a frequency-division-multiplex arrangement might, for example, comprise a plurality of modulation channels each provided with a single-sideband modulation circuit. The baseband signals $x_k(t)$ are each applied to one of the modulation channels. The single-sideband channel signals which are generated by these modulation channels are thereafter combined, which results in the desired SSB-FDM signal. A typical single-sideband modulation circuit for processing analog signals is the Weaver modulator which is described in reference 1 (see chapter D). Analog filters are used in this known single-sideband modulation circuit. The rapid development of the integrated circuit technology and the possibility of large scale integration of discrete circuits has made discrete filters much more attractive than their analog counterparts. The straight forward substitution, however, of discrete filters for analog filters results in a system which requires an undesirably high number of computational steps per second.

In the references 3, 4, 5 digital frequency-division-multiplex arrangements are described. These known arrangements are arranged for converting N digital baseband signals $\{x_k(n)\}$, (k = 1, 2, ... N; n = ... −3, −2, −1, 0, +1, +2, ...), which are each constituted by a series of components $x_k(n)$, and which each have associated therewith a sampling frequency 1/T, into a digital baseband single-sideband frequency-multiplex-signal $\{y(n)\}$, which is constituted by a series of components $y(n)$, and which has associated therewith a sampling frequency $1/T_1$, which is greater than or is equal to the frequency N/T. The signals $\{x_k(n)\}$ can each be applied to the arrangement through a separate lead, but also in a TDM format. For brevity's sake, the digital frequency-division-multiplex arrangement will hereinafter be indicated by "TDM-FDM" arrangement. These arrangements can be classified into two categories:

1. The first category includes those TDM-FDM arrangements which each comprises a plurality of modulation channels to each of which a baseband signal $\{x_k(n)\}$ is applied. In each of these modulation channels a modulation processing is performed using a carrier signal having a carrier frequency which is characterized for the relevant modulation channel, as well as a single-sideband modulation processing operation whereby each modulation channel generates the single-sideband modulated version of its input signal $\{x_k(n)\}$. The frequency spectrum of a typical single-sideband modulated version of an input signal $\{x_k(n)\}$ is located in a subband of the baseband FDM-signal, which subband is typical for the relevant baseband signal $\{x_k(n)\}$, and is characterized by said carrier frequency. With the TDM-FDM-arrangements described in references 3, 4 and 5 the baseband signals $\{x_k(n)\}$ are first applied to an input circuit which comprises means for selectively modulating these signals $\{x_k(n)\}$ for generating discrete selectively modulated baseband signals $\{r_k(n)\}$ having associated therewith a sampling frequency $1/T_r$. In particular this selective modulation consists in that each real baseband signal $\{x_k(n)\}$ is converted into a complex signal $\{r_k(n)\}$, wherein $r_k(n) = Re\ [r_k(n)] + j\ Im\ [r_k(n)]$, and wherein the components Re $[r_k(n)]$ and Im $[r_k(n)]$ occur with a sampling period T/2. Thereafter these complex signals, possibly after having been processed further, are modulated on a complex carrier signal having a carrier frequency which is characteristic for the relevant modulation channel. For performing said selective modulation and for performing said modulation on the complex carrier signal each modulation channel is constructed as a digital Weaver-modulator wherein digital modulators, as well as digital filters are used.

It is noted that in reference 5, a TDM-FDM-arrangement is described which is equivalent to the TDM- FDM-arrangements described in the references 3 and 4. Particularly the TDM-FDM-arrangement disclosed in reference 5 comprises only one single-sideband modulation channel, which for the various base-band signals $\{x_k(n)\}$ is operated in time sharing.

This equivalency also applies to what follows hereinafter.

2. The second category includes those TDM-FDM-arrangements wherein no modulation processing is applied utilizing a carrier signal having a carrier frequency which is characteristic for the relevant signal $\{x_k(n)\}$. In the TDM-FDM-arrangements of this category, use is made of the properties of a discrete signal, and more specifically of the fact that the frequency spectrum of a discrete signal has a periodical structure, the period being equal to the value of the sampling frequency 1/T of the baseband signal. An arrangement belonging to this second category has already been proposed in reference 4. It comprises N-signal channels, N being equal to the number of base-band signals. A baseband signal being applied to each of these signal channels. Each of the signal channels comprises means for increasing the sampling rate associated with the baseband signal by a factor of N to a value N/T. By increasing the sampling rate, a discrete signal $\{t_k(n)\}$ is obtained having a periodic frequency spectrum whose period is equal to, but whose fundamental intervals is equal to N/T (see chapter (1.2). Each interval of the length N/T of the frequency spectrum includes 2N subbands each having a width of 1/(2T). Each signal channel further comprises a discrete bandpass filter having a bandwidth 1/(2T). The passbands of the bandpass filter included in the successive signal channels coincide with the successive subbands of the first N subbands of the frequency spectrum of the discrete signal $\{t_k(n)\}$. So the output signals $\{u_k(n)\}$ of the successive bandpass filters represent the desired channel signals for the baseband FDM-signal.

The input circuit of this known arrangement also comprises means for selectively modulating the signals $\{x_k(n)\}$. In this particular case, this means that either the components of the signals $\{x_k(n)\}$ having an even number k, or those having an odd number k are multiplied by a factor $(-1)^n$. The result of this multiplication is described in chapter E(1.3).

B. SUMMARY OF THE INVENTION

The invention relates to a TDM-FDM arrangement of the second category, which is arranged for converting N discrete baseband signals $\{x_k(n)\}$, (k = 1, 2, 3, .. . N; n = 0, ± 1, ± 2 ...), having associated a sampling rate (1/T) and which each have a frequency spectrum $X_k(\omega)$ into a discrete baseband single-sideband frequency-division-multiplex-signal $\{y(n)\}$ having associated therewith a sampling rate (1/Ty) which is at least equal to (N/T) and, which has a frequency spectrum $Y(\omega)$ wherein $Y[\omega_1 + \omega_o + (k-1)(\pi/T)] = X_k(\omega_o)\psi_k(\omega_o)$.

It is an object of the invention to provide another concept of a TDM-FDM arrangement of the second category, and, as described in chapter A(2), with which a high degree of design freedom is realized and which may result in a simple TDM-FDM arrangement.

The TDM-FDM arrangement according to the invention is therefore characterized in that for $\omega_1 = 0$
I. it comprises
means for receiving said baseband signals $\{x_k(n)\}$;

means for selectively modulating the received signals $\{x_k(n)\}$ for generating baseband signals $\{r_k(n)\}$;
a transformation device for processing said selectively modulated baseband signals $\{r_k(n)\}$ for generating a plurality of discrete conversion signals $\{s_m(n)\}$, (m = 1, 2, 3, . . . N), said transformation device having associated therewith a transformation matrix A comprising the matrix elements $a_{mk}$ of a constant value and which transformation matrix is unequal to the Discrete Fourier Transform (DFT) matrix, and whereby the relation between the components $s_m(n)$ and the components $r_k(n)$ being given by $$s_m(n) = \sum_{k=1}^{N} a_{mk} r_k(n); \quad (1)$$

a plurality of signal channels to each of which a conversion signal is applied and which are each provided with discrete filter means and sampling rate increasing means for generating discrete signals $\{u_m(n)\}$; the transfer function of the signal channel determined by said discrete filter means being equal to $H_m(\omega)$;
means for forming a digital sum signal $$\sum_{m=1}^{N} u_m(n) \quad \text{wherein}$$

$$y(n) = \sum_{m=1}^{N} u_m(n); \quad (2)$$

II. that for each signal channel the relation between its transfer function $H_m(\omega)$ and the matrix elements $a_{mk}$ is given by the FDM-condition $$\frac{1}{2} \sum_{m=1}^{N} \left\{ a_{mk} H_m\left[\omega_o + (i-1)\frac{\pi}{T}\right] + a_{mk}^* H_m^*\left[-\frac{2\pi}{T_y} - \left(\omega_o + (i-1)\frac{\pi}{T}\right)\right]\right\} = \delta_{ki} \psi_i(\omega_o); \quad (3)$$

wherein:
m is the number of the relevant signal channel;
$\omega_o$ represents a frequency within the range $0 \leq \omega_o < \pi/T$;
$a_{mk}^*$ denotes the complex conjugate of $a_{mk}$;
$H_m^*(\omega)$ denotes the complex conjugate of $H_m(\omega)$;
i = 1, 2, 3, ... N;
$\delta_{ki} = 0$ for $k \neq i$
$\delta_{ki} = 1$ for k = i;
$\psi_i(\omega_o)$ denotes an arbitrary function of $\omega_o$.

The TDM-FDM arrangement according to the invention is also characterized in that for $\omega_1 \neq \rho(\pi/T)$ with $\rho = 0, \pm 1, \pm 2, \ldots$
I. it comprises:
means for receiving said signals $\{x_k(n)\}$;
a cascade arrangement of selective modulation means and complex modulation means, whose input is coupled to said receiver means and which is arranged for generating complex signals $\{r_k(n)\}$ with which complex modulation means a complex carrier signal having a frequency $(\omega_1/2\pi)$ is associated;
a transformation device for processing said signals $\{r_k(n)\}$ and for generating a plurality of discrete conversion signals $\{s_m(n)\}$, (m = 1, 2, 3, . . . N), said transformation device having associated therewith a transformation matrix A comprising the elements $a_{mk}$ of a constant value and which transformation matrix is unequal to the Discrete Fourier Transform (DFT)-matrix, and whereby the relation between the components $s_m(n)$ and the components $r_k(n)$ is given by $$s_m(n) = \sum_{k=1}^{N} a_{mk} r_k(n);$$

a plurality of signal channels, to each of which a conversion signal is applied and which are each provided with discrete filter means and sampling rate — increasing means for generating discrete signals $\{u_m(n)\}$; the transfer function of the signal channel determined by said discrete filter means being equal to $H_m(\omega)$;

means for forming a discrete sum signal $$\left\{ \sum_{m=1}^{N} u_m(n) \right\} \text{ wherein } y(n) = \sum_{m=1}^{N} u_m(n);$$

II. that for each signal channel the relation between its transfer function $H_m(\omega)$ and the matrix elements $a_{mk}$ is given by the FDM-condition $$H_m^*\left[ \frac{2\pi}{T_y} - \left( \omega_o + \omega_1 + (i-1)\frac{\pi}{T} \right) \right] = 0$$

$$\frac{1}{2} \sum_{m=1}^{N} a_{mk} H_m\left[ \omega_o + \omega_1 + (i-1)\frac{\pi}{T} \right] = \delta_{ki}\psi_i(\omega_o),$$

wherein:
m denotes the number of the relevant signal channel;
$\omega_o$ represents a frequency within the range $0 \leq \omega_o < (\pi/T)$;
$H_m^*(\omega)$ denotes the complex conjugate of $H_m(\omega)$;
$i = 1, 2, 3, \ldots N$;
$\delta_{ki} = 0$ for $k \neq i$
$\delta_{ki} = 1$ for $k = i$;
$\psi_i(\omega_o)$ denotes an aritrary function of $\omega_o$.

The invention also relates to an FDM-TDM-arrangement for converting a discrete baseband single-sideband frequency division-multiplex signal $\{y(n)\}$, $(n = 0, \pm 1, \pm 2, \pm 3 \ldots)$ having associated therewith a sampling rate $1/T_y$ which is at least equal to $N/T$ and which has a frequency spectrum $Y(\omega)$ into a number of N discrete baseband signals $\{x_k(n)\}$, $(k = 1, 2, 3, \ldots)$ each having associated therewith a sampling rate $1/T$ and which each have a frequency spectrum $X_k(\omega)$, wherein $X_k(\omega_o) = Y[\omega_o + \omega_1 + (k-1)(\pi/T)] \psi_k(\omega_o)$.

It is an another object of the invention to provide a FDM-TDM arrangement having a high degree of design freedom, so that a simple FDM-TDM arrangement can be obtained.

The FDM-TDM-device according to the invention is therefore characterized in that for $\omega_1 = 0$
I. it comprises:
means for receiving said discrete frequency division-multiplex-signal $\{y(n)\}$;
a plurality of signal channels to each of which said discrete frequency-division-multiplex signal $\{y(n)\}$ is applied and which are each provided with discrete filter means and sampling rate reduction means for generating discrete signals $\{s_m(n)\}$; the transfer function of the signal channel determined by said filter means being equal to $E_m(\omega)$;

a transformation device to which said discrete signals $\{s_m(n)\}$ are applied and which is arranged for processing these signals for generating a plurality of discrete signals $\{r_k(n)\}$; said transformation device having associated therewith a transformation matrix B comprising the matrix elements $b_{km}$ of a constant value and which transformation matrix is unequal to the Inverse Discrete Fourier Transform (IDFT) matrix and whereby the relation between the components $s_m(n)$ and the components $r_k(n)$ is given by:

$$r_k(n) = \sum_{m=1}^{N} b_{km} s_m(n)$$

an output circuit to which the signals $\{r_k(n)\}$ are applied and which is provided with means for selectively modulating the signals $\{r_k(n)\}$ for generating said discrete baseband signals $\{x_k(n)\}$;
II. that for each signal channel the relation between its transfer function $E_m(\omega)$ and the matrix elements $b_{km}$ is given by the TDM-condition $$\frac{1}{2N} \sum_{m=1}^{N} \left\{ b_{km} E_m\left[ \omega_o + (i-1)\frac{\pi}{T} \right] + b_{km}^* E_m^* \right.$$

$$\left. \left[ \frac{2\pi}{T_y} - \left( \omega_o + (i+1)\frac{\pi}{T} \right) \right] \right\} = \delta_{ki}\psi_i(\omega_o)$$

wherein:
m represents the number of the relevant signal channel;
$\omega_o$ represents a frequency within the range $0 \leq \omega_o < (\pi/T)$;
$b_{km}^*$ denotes the complex conjugate of $b_{km}$;
$E_m^*(\omega)$ denotes the complex conjugate of $E_m(\omega)$;
$i = 1, 2, 3, \ldots N$
$\delta_{ki} = 0$ for $k \neq i$
$\delta_{ki} = 1$ for $k = 1$
$\psi_i(\omega_o)$ denotes an arbitrary function of $\omega_o$.

The FDM-TDM arrangement according to the invention is also characterized in that for $\omega_1 \neq \rho(\pi/T)$ with $\rho = 0, \pm 1, \pm 2, \ldots$
I. it comprises:
means for receiving said frequency-division-multiplex-signal $\{y(n)\}$;
a plurality of signal channels to each of which said discrete frequency-division-multiplex-signal $\{y(n)\}$ is applied and each comprising discrete filter means and sampling rate reduction means for generating discrete signals $\{s_m(n)\}$; the transfer function of the signal channel determined by said filter means being equal to $E_m(\omega)$;
a transformation device to which said discrete signals $\{s_m(n)\}$ are applied and which is arranged for processing these signals for generating a plurality of discrete signals $\{r_k(n)\}$, said transformation device having associated therewith a transformation matrix B comprising the matrix elements $b_{km}$ of a constant value, said transformation matrix being unequal to the Inverse Discrete Fourier Transform (IDFT) matrix, whereby the relation between the components $s_m(n)$ and the components $r_k(n)$ is given by $$r_k(n) = \sum_{m=1}^{N} b_{km} s_m(n);$$

an output circuit to which the signals $\{r_k(n)\}$ are applied and which comprises a cascade arrangement of selective modulation means and complex modulation means with which a complex carrier signal having the frequency $(\omega_1/2\pi)$ is associated, for generating said discrete baseband signals $\{x_k(n)\}$;

II. that for each signal channel the relation between the transfer function $E_m(\omega)$ and the matrix elements $b_{km}$ is given by the TDM-condition $$E_m^*\left[\frac{2\pi}{T_y} - \left(\omega_1 + \omega_o + (i-1)\frac{\pi}{T}\right)\right] = 0$$

$$\frac{1}{2N}\sum_{m=1}^{N} b_{km}E_m\left[\omega_1 + \omega_o + (i-1)\frac{\pi}{T}\right] = \delta_{ki}\psi_i(\omega_o);$$

wherein:
m represents the number of the relevant signal channel;
$\omega_o$ represents a frequency within the range $0 \leq \omega_o < (\pi/T)$;
$E_m^*(\omega)$ denotes the complex conjugation of $E_m(\omega)$
i = 1, 2, 3, ... N
$\delta_{ki} = 0$ for $k \neq 1$
$\delta_{ki} = 1$ for $k = i$
$\psi_i(\omega_o)$ denotes an arbitrary function of $\omega_o$.

In order to avoid interchannel interference very complex discrete filters must be used in the arrangements described in chapter A(2).

By means of, for example, the instruction given in expression (3), and by using the further measures according to the invention, it is possible to realize an optimum distribution of the circuit complexity over the transformation device and the discrete filter means. More in particular, many applications, such as the conversion of a number of signalling signals into an FDM-format allow a particularly simple transformation device together with simple discrete filter means. If the matrix elements $a_{mk}$ are each given by $\alpha_{mk} + j\beta_{mk}$, then the values of the constants $\alpha_{mk}$ and $\beta_{mk}$ may, for example, be given by the set of numbers (0, +1, -1).

It should be noted that in reference 6 to 10 inclusive TDM-FDM arrangements as well as FDM-TDM arrangements are described which must be considered as special embodiments of the generic arrangement according to the invention. In these special embodiments a transformation device is used in the form of a DFT (Discrete Fourier Transformer), so that the matrix elements $a_{mk}$ are equal to exp $[-2\pi j(m-1)(K-1)/N]$, wherein N again represents the number of baseband signals $\{x_k(n)\}$. The instruction which, for example, is defined in expression (3) is not indicated in these references and it is also not possible to derive them therefrom. These references also do neither show nor suggest that other values of the matrix elements may be used. Modifications of the TDM-FDM arrangements, as well as modifications of the FDM-TDM-arrangement described in next chapters, are not indicated in these references and cannot be deduced therefrom.

The TDM-FDM arrangement according to the invention and the TDM-FDM arrangement described in the references 6 to 10 inclusive have in common that the baseband signals $\{x_k(n)\}$ are not processed separately as in the second class TDM-FDM arrangement described in reference 4, but that they are mutually mixed in a transformer.

It should be noted that a discrete signal is defined as a signal which is exclusively defined at discrete time instants (see reference 2). These signals can be classified in two categories, namely:
1. Digital signals. These signals are discrete time signals that can take on discrete amplitude values. Such signals are available in the form of a series of numbers which are each represented by a given number of bits.
2. "Sampled data" signals. These signals are discrete time signals that can take on a continuum of amplitude values. For storing such signals "charge coupled devices" (CCD's) are, for example, used.

Arrangements which are suitable for processing "digital signals are called digital arrangements", while arrangements which are suitable for processing sampled data signals are indicated correspondingly as "sampled data arrangements".

What follows hereinafter applies to both a digital and to a sampled data arrangement and the invention will be further explained with reference to a digital TDM-FDM arrangement and a digital FDM-TDM arrangement.

C. SHORT DESCRIPTION OF THE FIGURES

Figure 16:
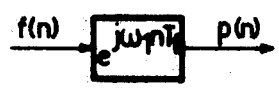

The FIGS. 12, 13, 14 15 show some diagrams for explaining the operation of the sideband interchanging modulator;

FIG. 16 shows the symbol for a complex modulator, and

Figure 17:
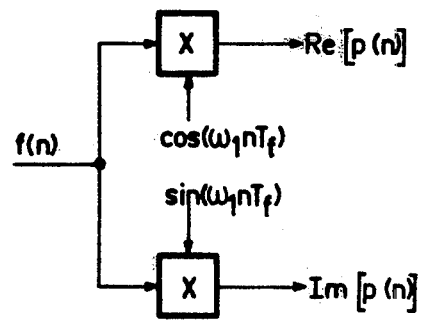
Figure 18A:
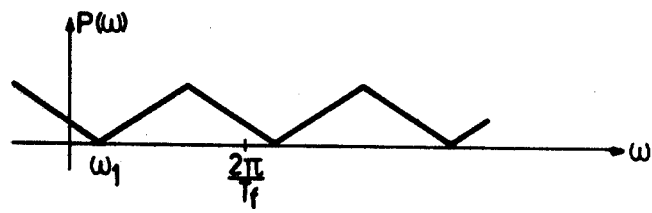
Figure 18B:
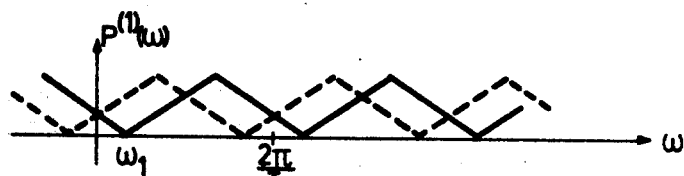
Figure 18C:
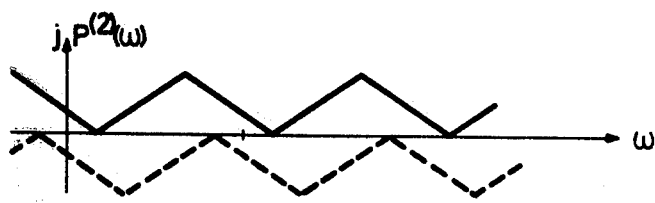
Figure 19:
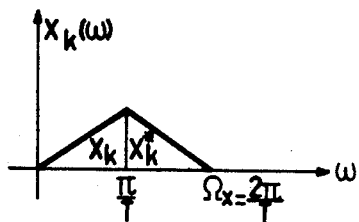
Figure 20A:
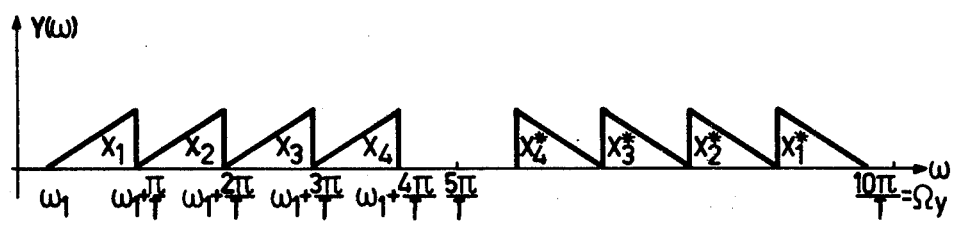
Figure 20B:
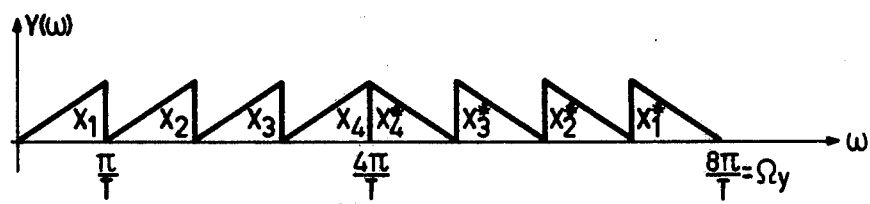
Figure 22:
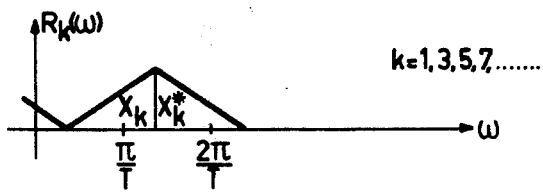
Figure 22:
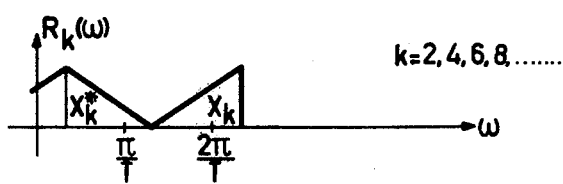
Figure 21:
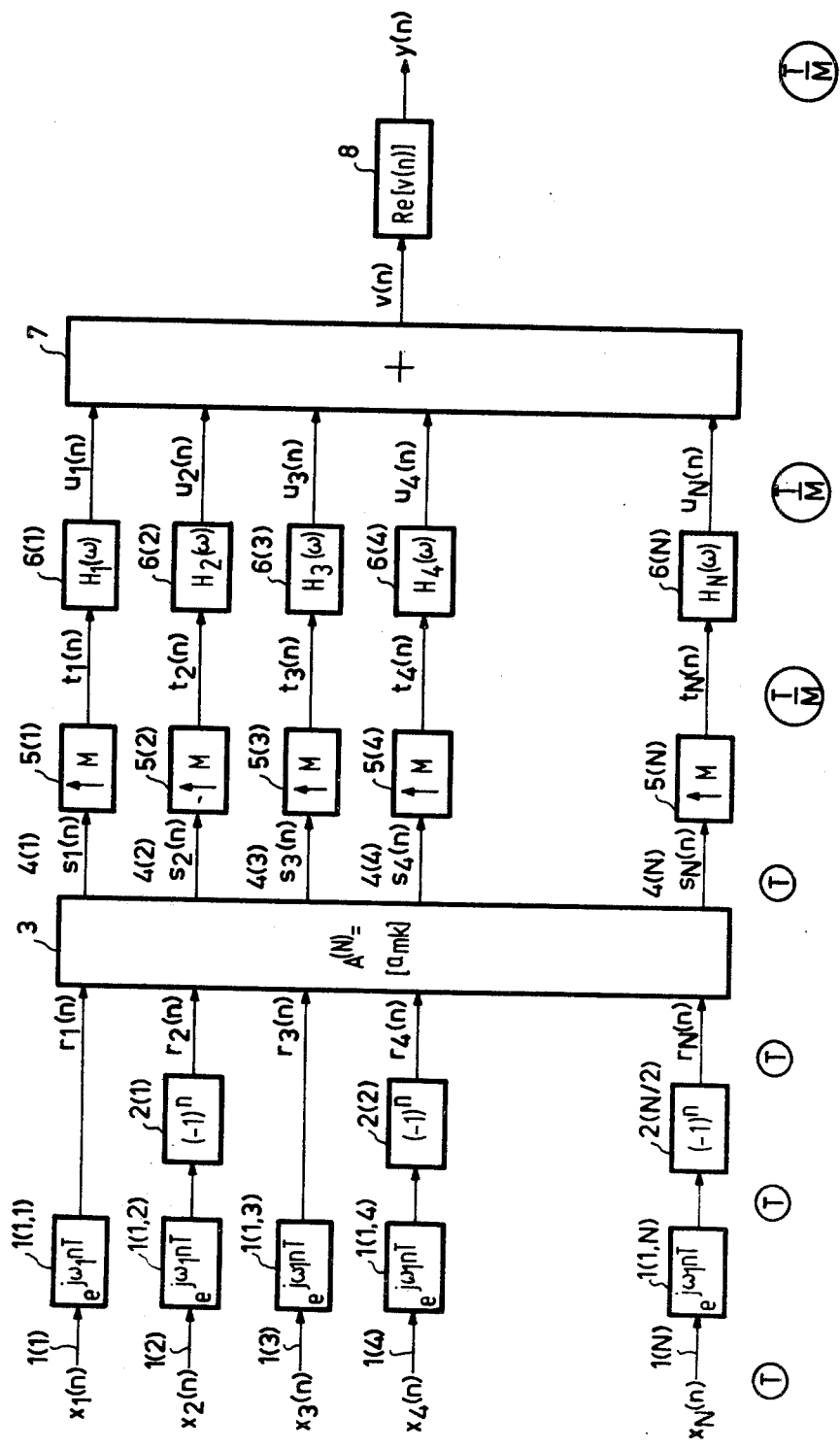
Figure 23:
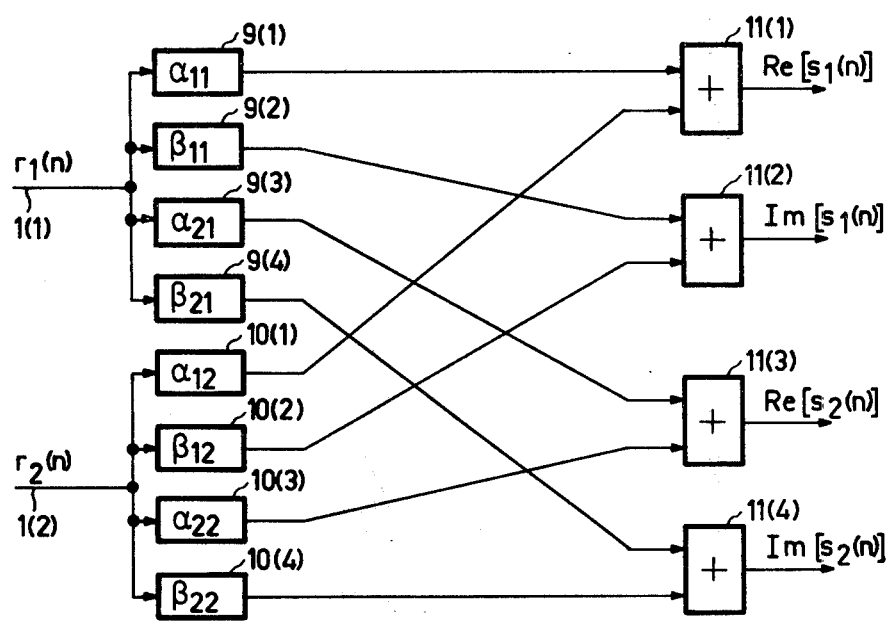
Figure 25:
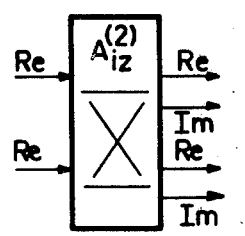
Figure 26:
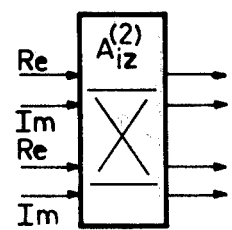
Figure 24:
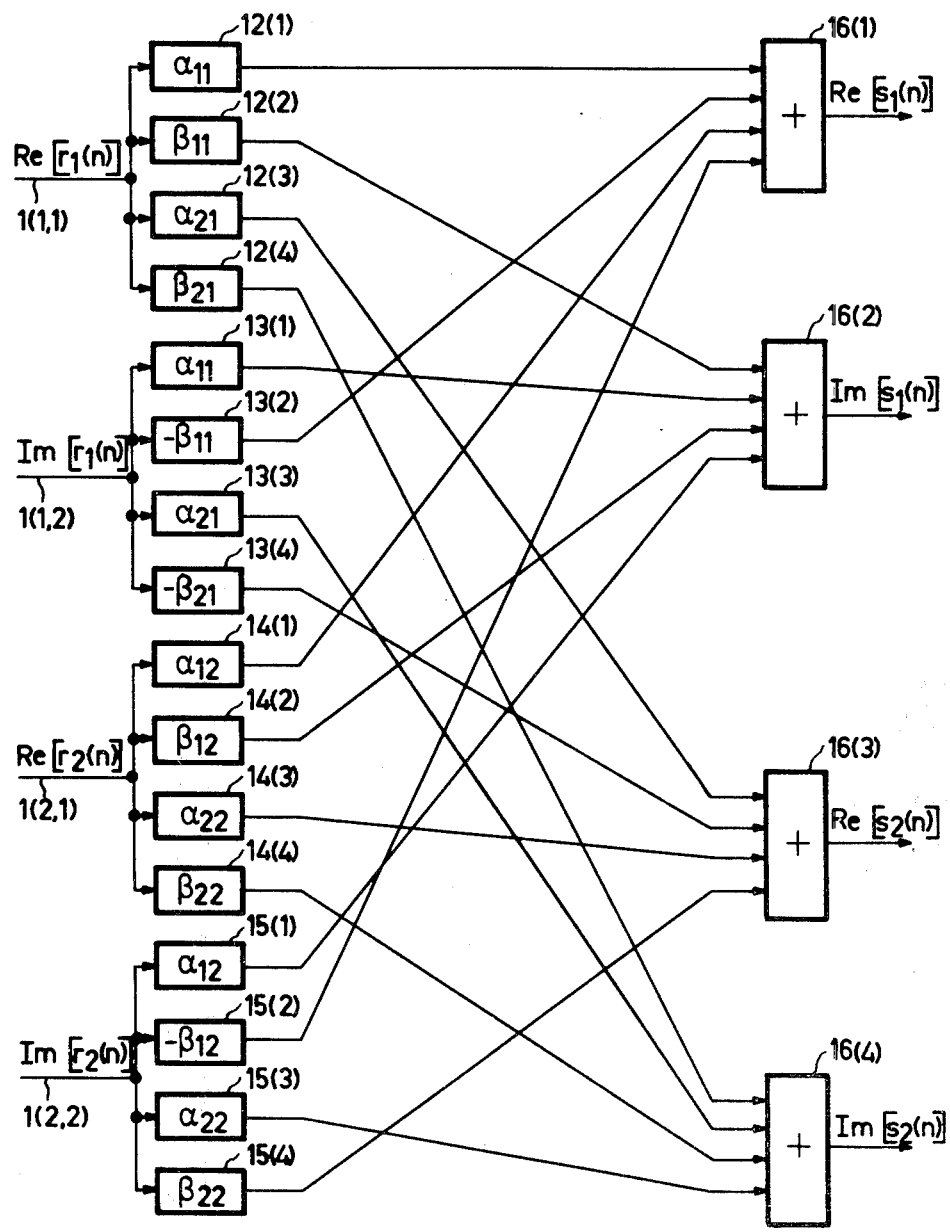
Figure 27:
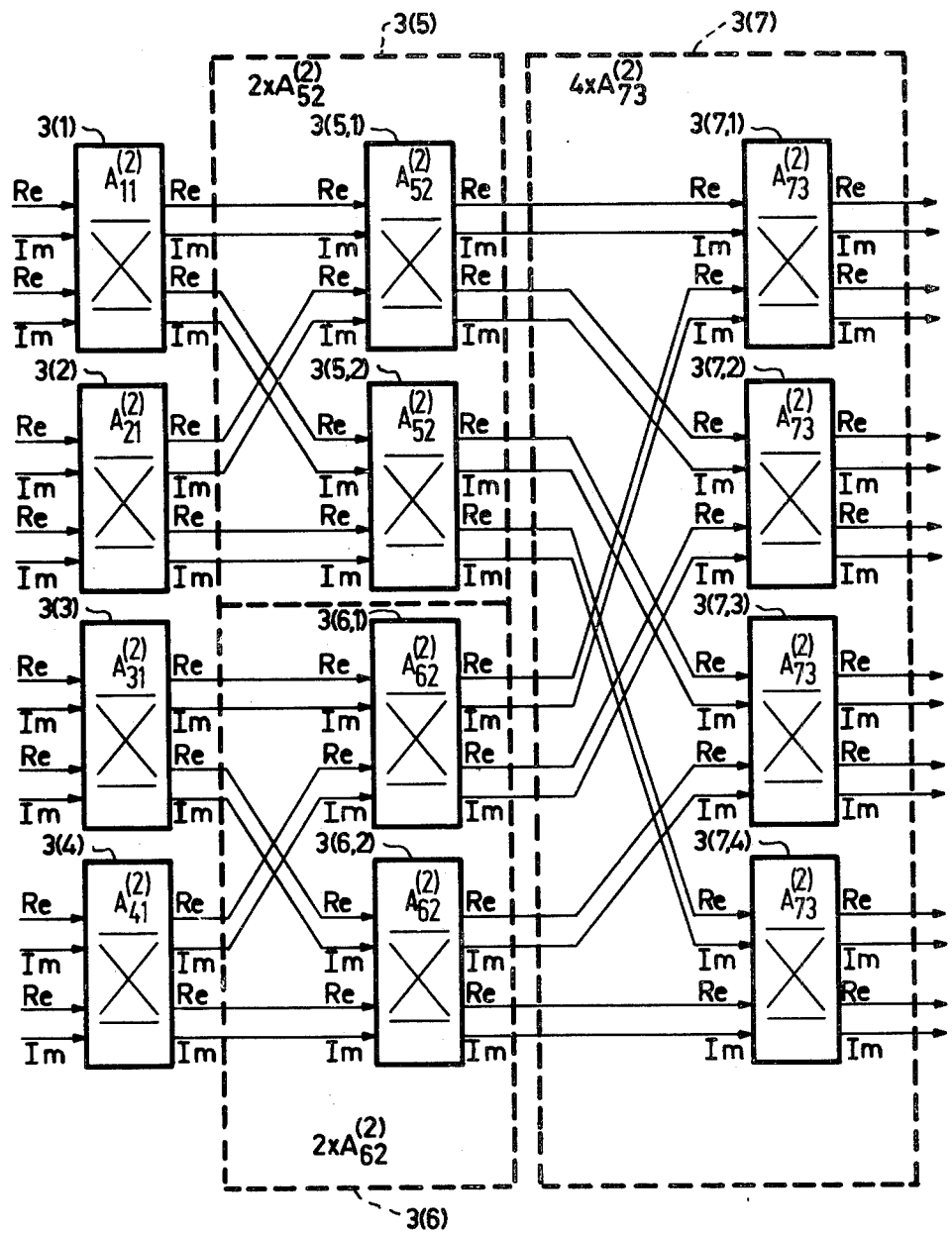
Figure 28:
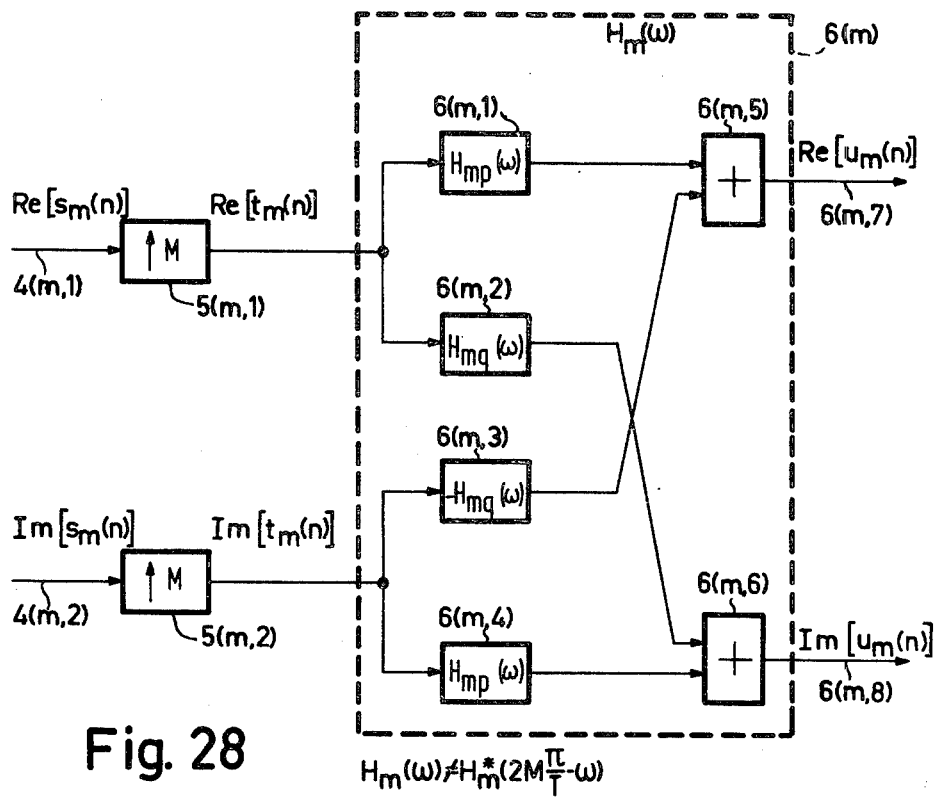
Figure 28A:
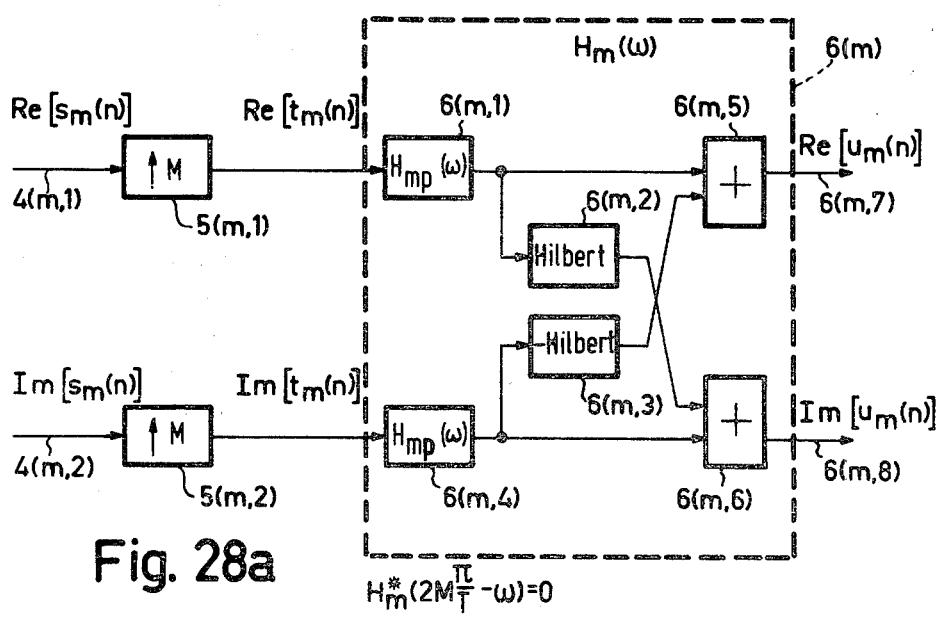
Figure 28B:
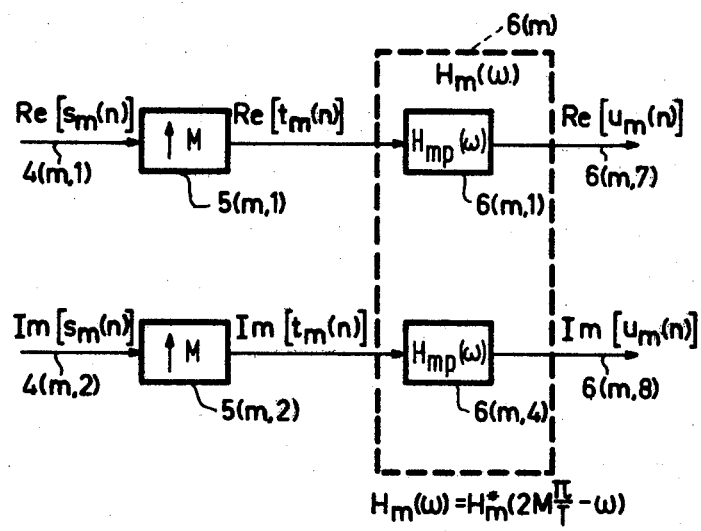
Figure 28C:
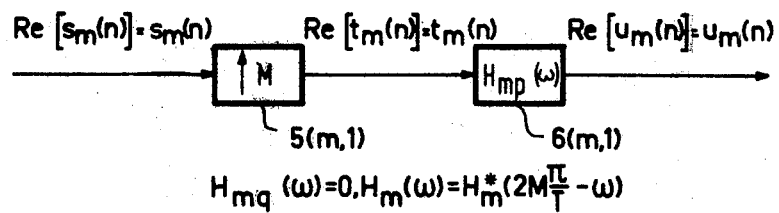
Figure 29:
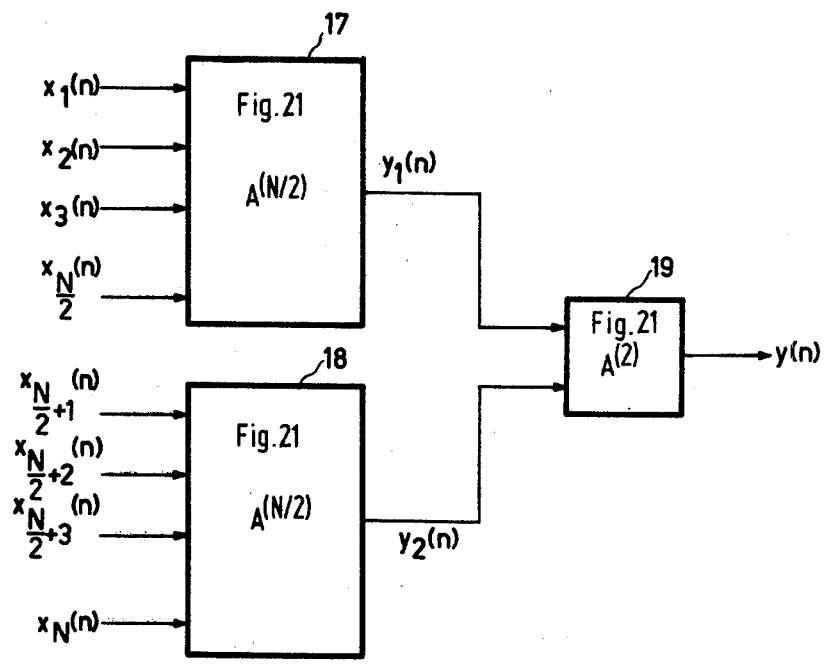
Figure 31:
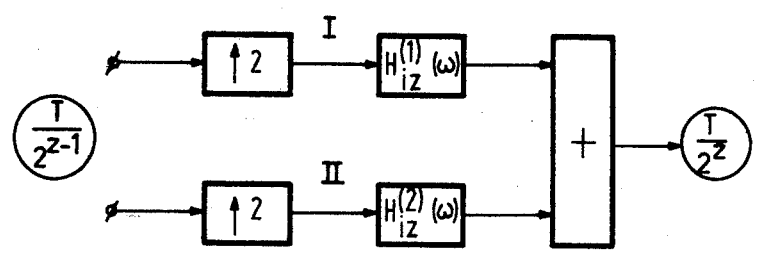
Figure 30:
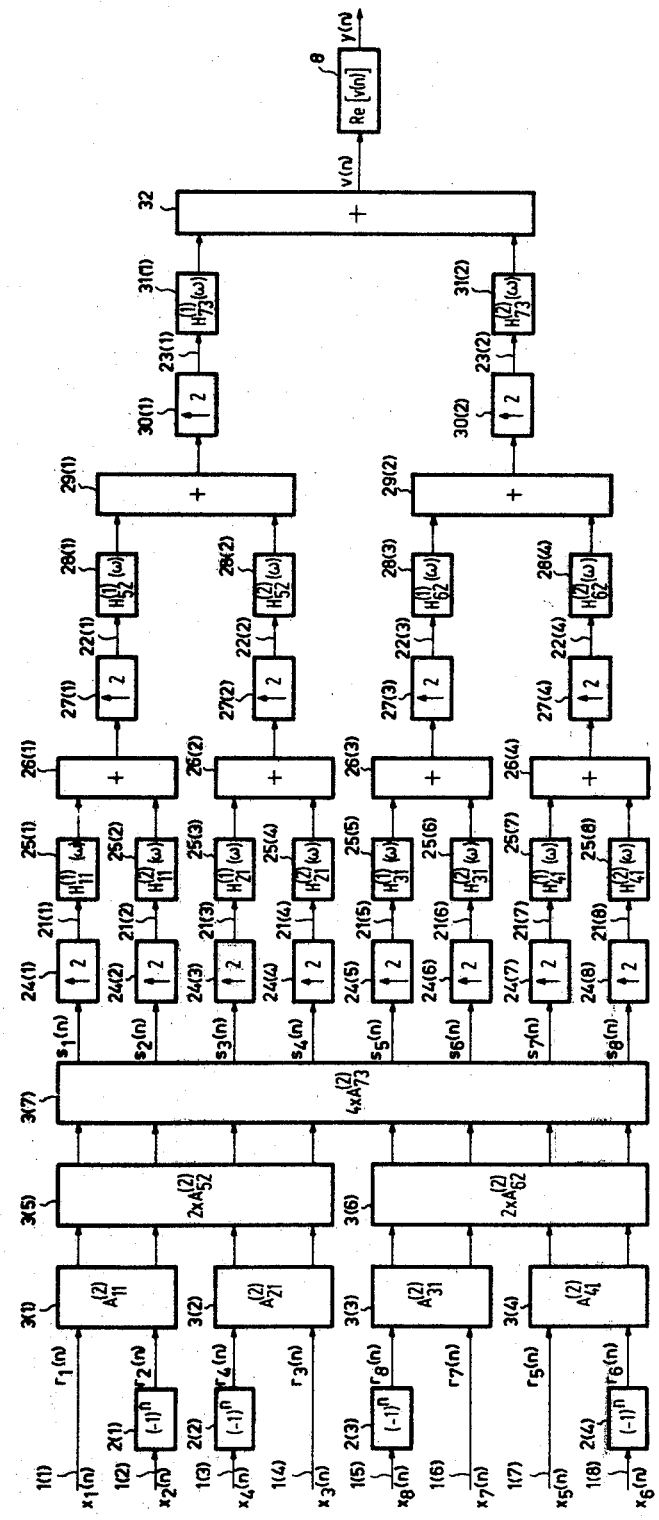
Figure 39:
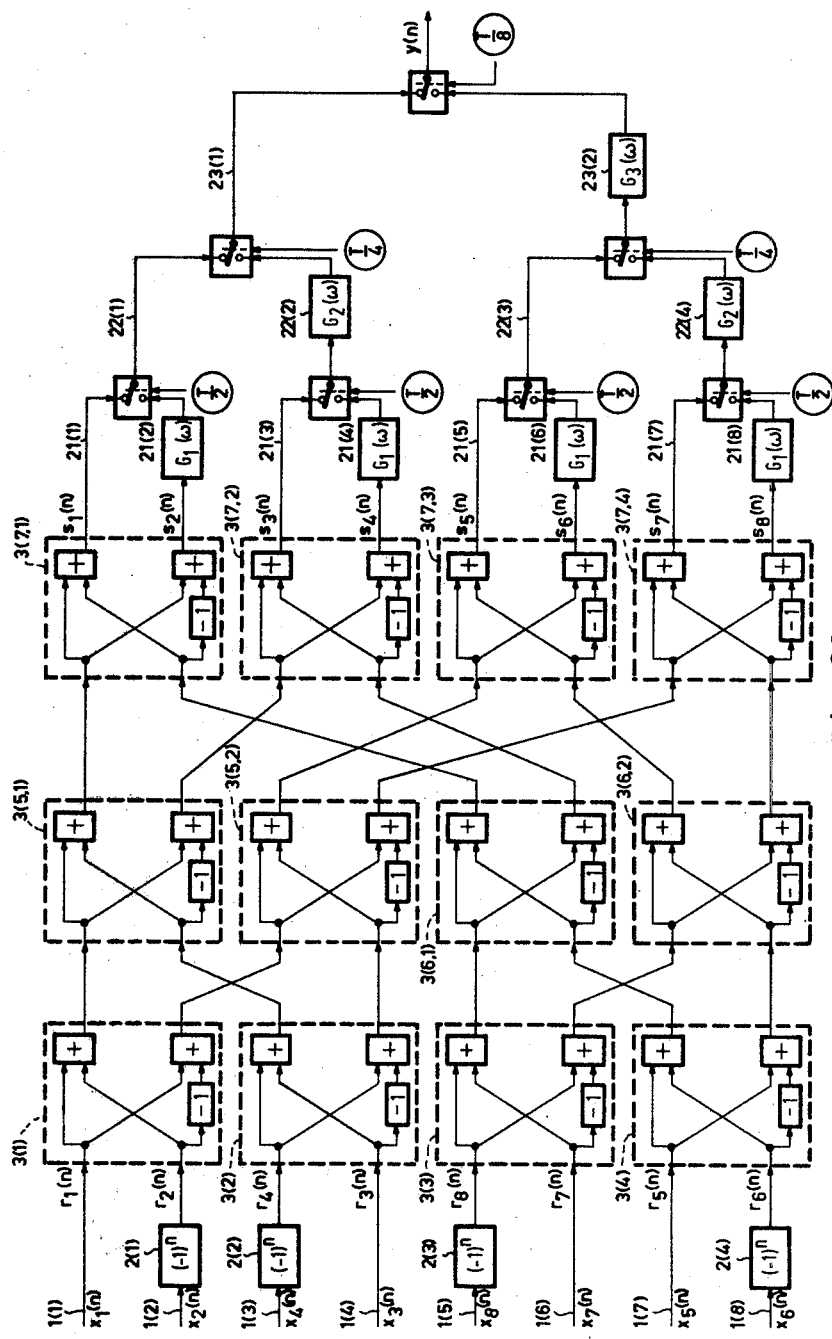
Figure 44:
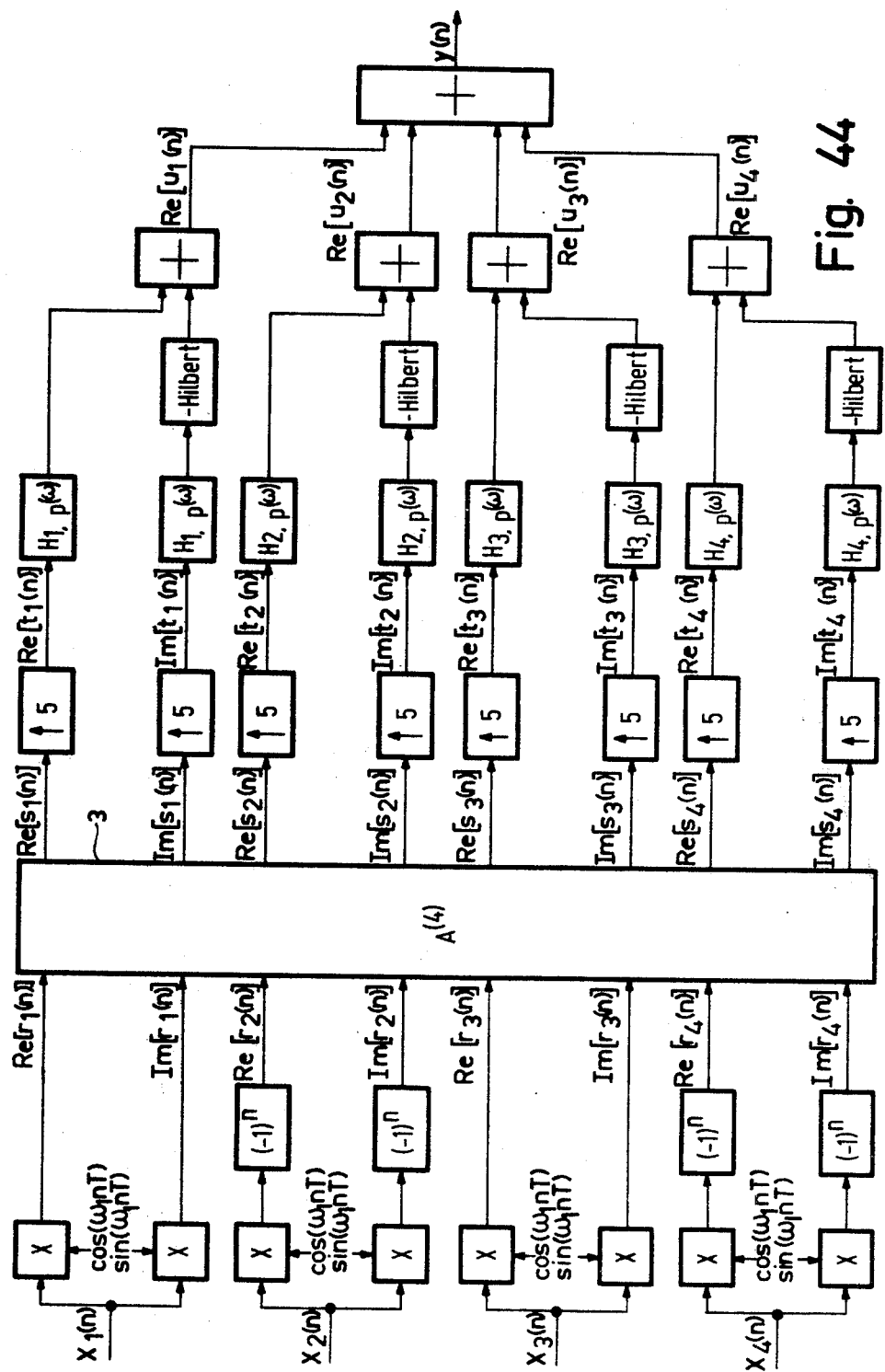
Figure 45:
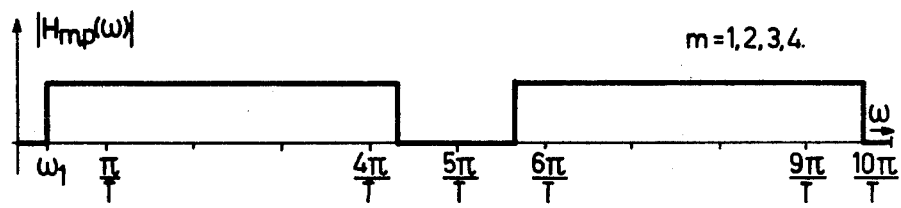
Figure 46:
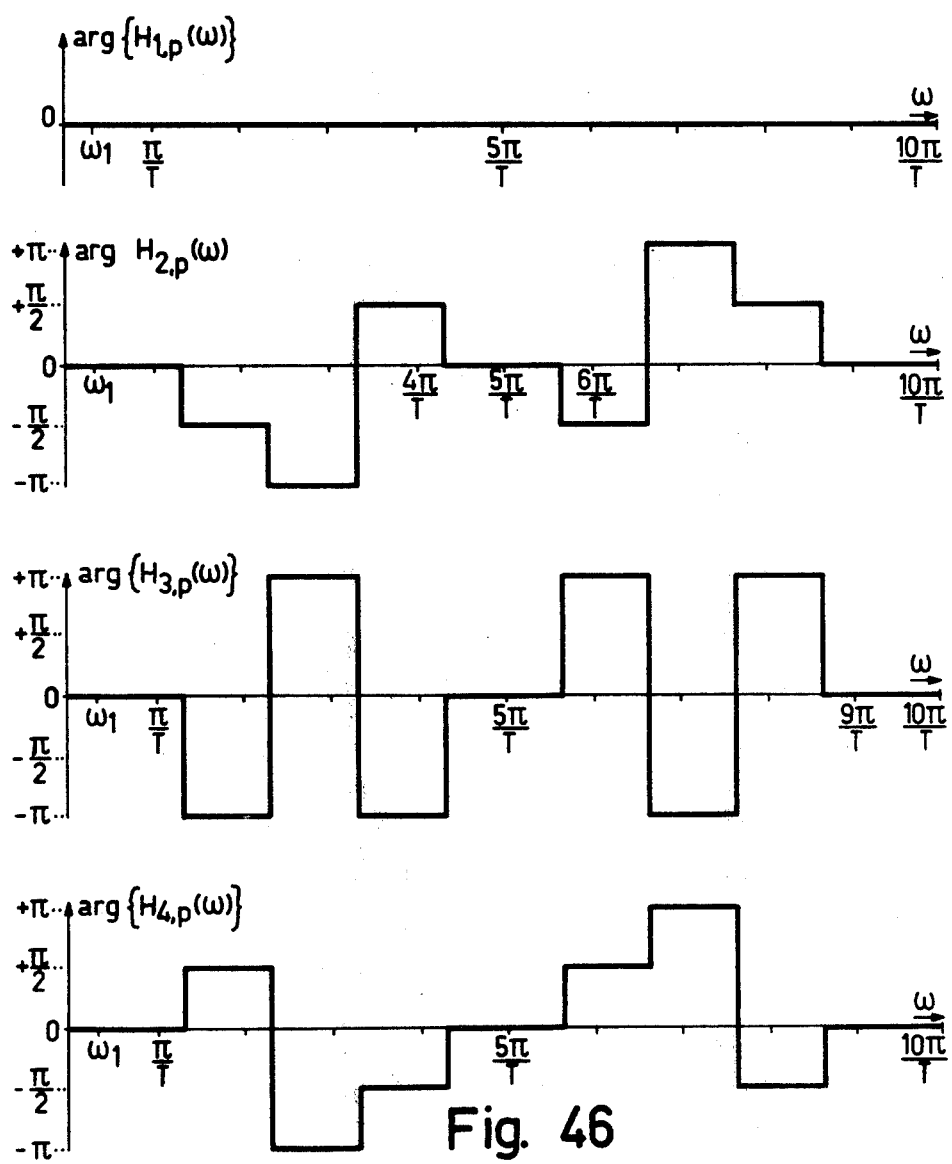
Figure 47:
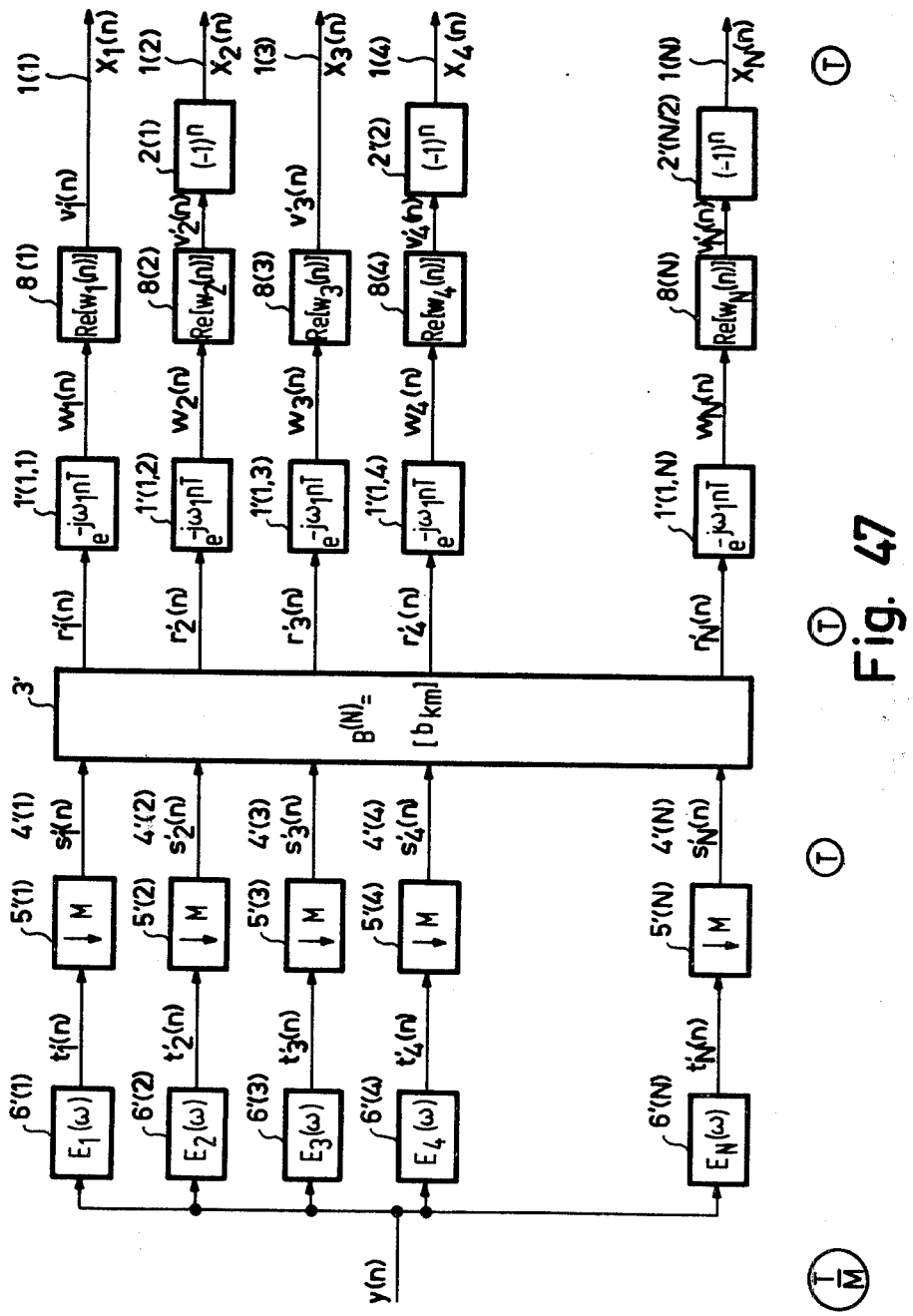

FIG. 17 shows an embodiment of such a modulator; while the FIGS. 18a, 18b and 18c show some frequency spectra of the signals produced by the complex modulator;

FIG. 19 shows the frequency spectrum of a real input signal of the TDM-FDM arrangement;

FIGS. 20a and 20b show two possible frequency spectra of the real SSB-FDM signal;

FIG. 21 shows the basic diagram of the TDM-FDM arrangement according to the invention;

FIG. 22 shows the frequency spectra of some input signals of the transformer in the TDM-FDM arrangement according to the invention;

FIG. 23 shows an embodiment of a two-point transformer for real input signals and complex multiplication factors, and FIG. 25 shows the symbol of such a transformer;

FIG. 24 shows an embodiment of a two-point transformer for complex input signals and complex multiplication factors, and FIG. 26 shows the symbol of such a transformer;

FIG. 27 shows an eight-point fast transformer for use in the TDM-FDM arrangement shown in FIG. 21;

FIG. 28 shows the general set-up of a signal channel of the device according to FIG. 21 and the FIGS. 28a, 28b and 28c show modified versions of the signal channel of FIG. 28;

FIGS. 29 and 30 show modified versions of the TDM-FDM arrangement shown in FIG. 21;

FIG. 31 shows a single circuit configuration which is used for the set-up of the signal channels in the arrangement according to FIG. 30;

The FIGS. 32, 33, 35 and 38 and 40 show some modifications of the circuit configuration shown in FIG. 31;

The FIGS. 34, 36, 37, 41, 42 and 43 show some transfer functions of filter means which are used in the circuit configurtions of the FIGS. 32, 33, 35, 38 and 40;

FIG. 39 shows a detailed embodiment of a TDM-FDM arrangement wherein the transformer is based on a Hadamard matrix and wherein real signals are applied to the transformer;

FIG. 44 shows an embodiment of a TDM-FDM arrangement wherein the transformer is based on a complex matrix and to which complex signals are applied;

The FIGS. 45 and 46 show some transfer functions of the digital filters used in the device of FIG. 44;

FIG. 47 shows an embodiment of an FDM-TDM arrangement.

D. REFERENCES

1. A Third Method of Generation and Detection of Single-Sideband Signals; D. K. Weaver; Proceedings of the IRE, December 1956, pages 1703-1705.

2. "Terminology in Digital Signal Processing"; L. R. Rabiner c.s.; IEEE Transactions on Audio and Electroacoustics, vol. AU-20, No. 5, December 1972, pages 322-337.

3. "On Digital Single-Sideband Modulators; S. Darlington; IEEE Transactions on Circuit Theory; vol. CT-17, No. 3, August 1970, pages 409-414.

4. Design of Digital Filters for an All Digital Frequency-Division Multiplex Time-Division Multiplex Translator; S. L. Freeny c.s.; IEEE Transactions on Circuit Theory, vol. CT-18, No. 6, November 1971, pages 702-710.

5. SBB/FDM Utilizing TDM Digital Filters; C. F. Kurth; IEEE Transactions on Communication Technology, vol. COM-19, No. 1, February 1971, pages 63-71.

6. "TDM-FDM Transmultiplexer; Digital Polyphase and FFT"; M. G. Bellanger, J. L. Daguet; IEEE Transactions on Communications, vol. COM-22, No. 9, September 1974, pages 1199-1205.

7. "Single-Sideband System for Digital Processing of a Plurality of Channel Signals; U.S. Pat. No. No. 3,891,803.

8. "Circuit Arrangement for Digital Processing A Given Number of Channel Signals U.S. Pat. No. 971,922.

9. "A Digital Block-Processor for SSB-FDM Modulation and Demodulation"; P. M. Terrell, P. J. W. Rayner; IEEE Transactions on Communications, vol. COM-23, No. 2, February 1975, pages 282-286.

10. "Arrangement for Processing Auxiliary Signals in a Frequency Division-Multiplex Transmission System"; U.S. Patent Application No. 697,357, filed June 18, 1976.

11. "Digital Signal Processing;" A. V. Oppenheim, R. W. Schafer; Prentice-Hall, inc., Englewood Cliffs, New Jersey 1975.

12. "A Digital Signal Processing Approach to Interpolation;" R. W. Schafer, L. R. Rabiner: Proceedings of the IEEE, Vol. 61, No. 6, June 1973, pages 692-702.

13. "Digital Signal Processing"; B. Gold, C. M. Rader; McGraw-Hill Book Company, 1969.

14. "Theory and Application of Digital Signal Processing;" L. R. Rabiner, B. Gold; Prentice-Hall, inc., Englewood Cliffs, New Jersey 1975.

15. "Digital Filter;" U.S. Pat. No. 3,928,755.

16. "Interpolating Digital Filter;" U.S. Pat. No. 3,988,607.

17. "Interpolating Non-recursive Digital Filter;" U.S. Pat. No. 4,052,605.

18. "System for the Transmission of Analog Signals by Means of Pulse Code Modulation;" U.S. Pat. No. 3,904,963.

E. DESCRIPTION OF THE EMBODIMENTS

E(1) Introduction

E(1.1) Digital signals and their frequency spectra

As is noted already that a digital signal is a signal which is both time and amplitude discrete. Such a signal may, for example, be obtained by sampling an analog signal b(t) at instants $n.T_b$ wherein $n = 0, \pm 1, \pm 2, \ldots$ and wherein $T_b$ represents the sampling period. The samples of the signal b(t) thus obtained are each quantized and may be converted into a multi-digit digital number. The $n^{th}$ sample of the analog signal b(t) will be denoted by b(n) and will be called a component. Now the digital signal can formally be represented by the series $\{b(n)\}$.

Figure 1:
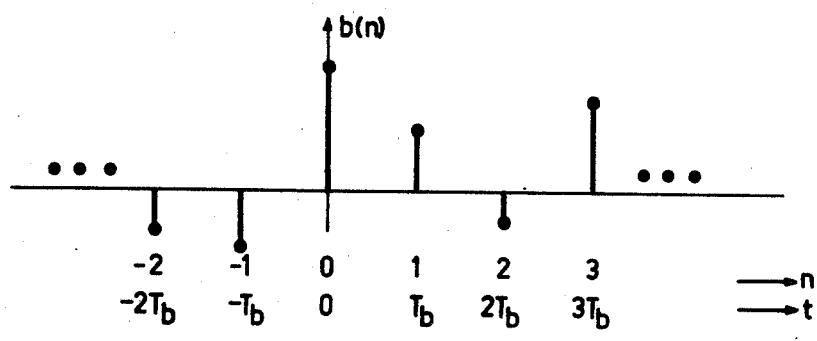
FIG. 1 shows the graphical representation of a digital signal.

Digital signals and, in general, discrete signals are usually graphically represented in the manner shown in FIG. 1. (see also reference 11). Although the abscissa is drawn as a continuous line it should be noted that b(n) is only defined for integer values of n. It is incorrect to think that b(n) is zero for all values of n which are not an integer; b(n) is simply undefined for noninteger values of n.

The frequency spectrum of this discrete signal $\{b(n)\}$ is given by the equation $$B(\omega) = \sum_{n=-\infty}^{\infty} b(n) e^{-jn\omega T_b}. \tag{4}$$

Eq. (4) shows the frequency spectrum $B(\omega)$ is periodical and its period is equal to $(2\pi/T_b)$ so that:

$$B(\omega + \alpha \frac{2\pi}{T_b}) = B(\omega) \text{ where } \alpha \text{ is an integer} \tag{5}$$

If b(n) represents a real signal it furthermore follows from Eq, (4) that:

$$B^*(\omega) = B(\frac{2\pi}{T} - \omega). \tag{6}$$

In Eq. (6) $B^*(\omega)$ represents the complex conjugated value of $B(\omega)$.

By means of the inverse transform, the digital signal $\{b(n)\}$ can be obtained from its frequency spectrum $B(\omega)$. This inverse transformation is mathematically given by the equation.

$$b(n) = \frac{T_b}{2\pi} \int_0^{\frac{2\pi}{T_b}} B(\omega) e^{jn\omega T_b} d\omega. \tag{7}$$

Figure 2:
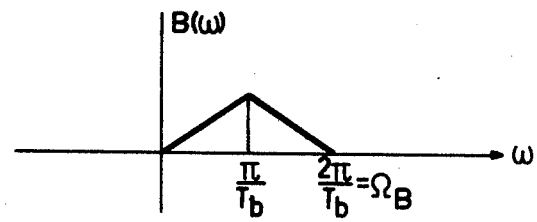
FIG. 2 shows schematically the frequency spectrum of a digital signal.

Because $B(\omega)$ is a periodic function in $\omega$ (see (5)), any arbitrary frequency interval of the length $(2\pi/T_b)$ may be taken as the integration frequency interval. Consequently the description of this frequency spectrum can be limited to the description of one frequency interval. This frequency interval will be indicated by $\Omega_B$, and will be called "the fundamental interval." In what follows hereinafter the frequency spectrum of a digital signal will be described in the fundamental interval $0 < \omega < \Omega_B$. FIG. 2 shows diagrammatically the frequency spectrum of the digital signal $\{b(n)\}$ shown in FIG. 1.

E(1.2) Sampling rate alteration

Figure 3:
FIG. 3 shows the symbol for a device for increasing the sampling rate (SRI-element)
Figure 4:
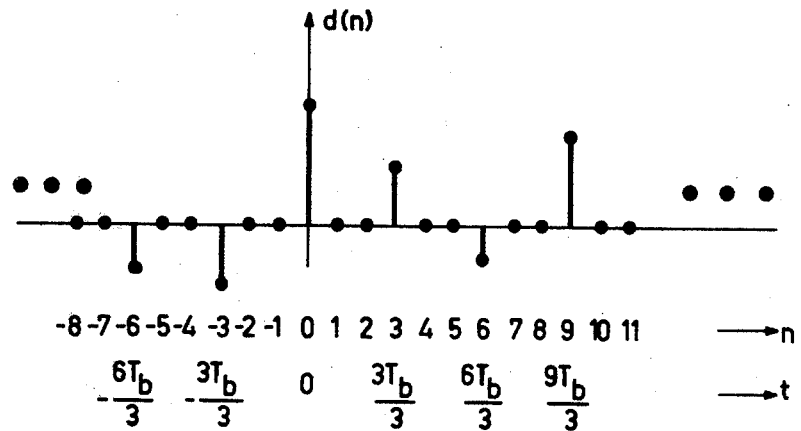
FIGS. 4 and 5 show diagrams for explaining the operation of the SRI-element.

In the arrangements to be described, elements are used for increasing or reducing the sampling rate which is associated with the digital input signal of this element. An element which is used for increasing the sampling rate will be indicated by the symbol shown in FIG. 3 and will be called SRI-element (SRI = Sample Rate Increase). In the drawing of FIG. 3, q represents the increase factor and q is an integer. If, more in particular, the sampling rate which is associated with the digital input signal of this SRI-element is equal to $(1/T)$, then the sampling rate which is associated with its digital output signal is equal to $(q/T)$. The operation of an SRI-element is as follows. Between each two successive components of the digital input signal, q-1 zero-valued components are inserted. If, for example the digital signal $\{b(n)\}$ shown in FIG. 1 is applied to the SRI-element of FIG. 3, a digital output signal $\{d(n)\}$ is obtained which in case q = 3 has the form depicted in FIG. 4. The operation of this SRI-element is mathematically described by the expressions:

$$d(n) = b\left(\frac{n}{q}\right) \text{ for: } n=0, \pm q, \pm 2q, \tag{8}$$
$$= 0 \quad \text{for: all other values of } n.$$

Because the sampling rate with which the components d(n) occur is equal to $(q/T_b)$, the fundamental interval of the frequency spectrum $D(\omega)$ of the signal $\{d(n)\}$ is equal to:

$$\Omega_D = \frac{2\pi q}{T_b} = q \cdot \Omega_B. \tag{9}$$

From (8) and (4) it follows that:

$$D(\omega) = B(\omega). \tag{10}$$

Figure 5:
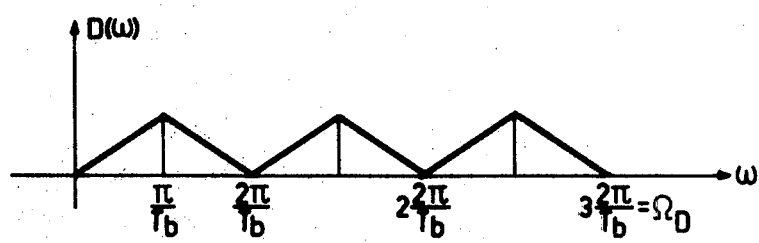

Because $\Omega_D = q\Omega_B$, the fundamental interval of the frequency spectrum $D(\omega)$ consequently comprises q fundamental intervals of the frequency spectrum $B(\omega)$. For q = 3 this is diagrammatically depicted in FIG. 5.

Figure 6:
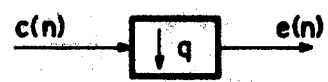
FIG. 6 shows the symbol of a device for reducing the sampling rate (SSR-element) and the FIGS. 7, 8, 9 and 10 show some diagrams for explaining the operation of the SRR-element.
Figure 7:
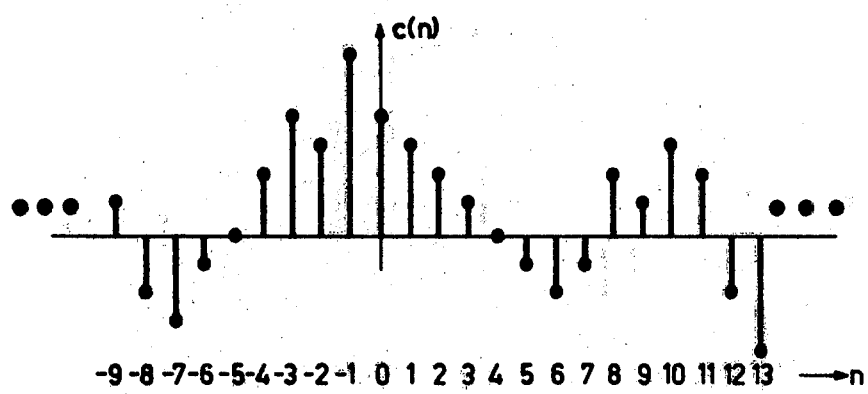
Figure 8:
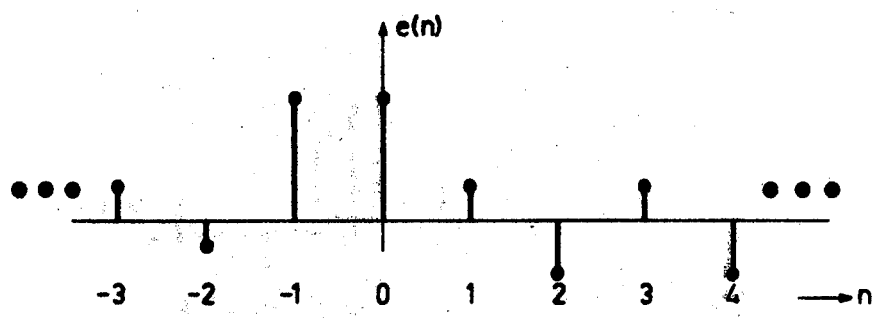

An element which is used for reducing the sampling rate will be indicated by the symbol shown in FIG. 6 and will be called "SRR-element" (SRR = Sample Rate Reduction). In the drawing of FIG. 6, q represents the reduction factor, and q is an integer. If more in particular, the sampling rate which is associated with the digital input signal of this SRR-element is equal to $(1/T)$, then the sampling rate which is associated with its digital output signal is equal to $(1/qT)$. Such a SRR-element operates as follows. Each time one out of each q successive input samples of this element is selected and applied to its output. If the digital input signal of the SRR-element is formed by the signal $\{c(n)\}$ depicted in FIG. 7, a digital signal $\{e(n)\}$ is obtained at its input which in case q = 3 has the form depicted in FIG. 8. The operation of this SRR-element can mathematically be described by the expression $$e(n) = c(nq). \tag{11}$$

If now a sampling rate $(1/T_c)$ is associated with $\{c(n)\}$, and a sampling rate $(1/T_e)$ with $\{e(n)\}$, then it holds that $T_e = qT_c$. The fundamental interval of the frequency spectrum $C(\omega)$ of $\{c(n)\}$ is now equal to $\Omega_C = (2\pi/T_c)$, and the fundamental interval of the frequency spectrum $E(\omega)$ of $\{e(n)\}$ is equal to $\Omega_E = (2\pi/T_e) = (2\pi/qT_c)$, so that $\Omega_E = (1/q)\Omega_C$. By substituting expression (11) in expression (4), it can be proved that the relation between $E(\omega)$ and $C(\omega)$ can mathematically be described by the expression:

$$E(\omega) = \frac{1}{q} \sum_{k=1}^{q} C\left[\omega + (k-1)\frac{2\pi}{qT_c}\right]. \tag{12}$$

Figure 9:
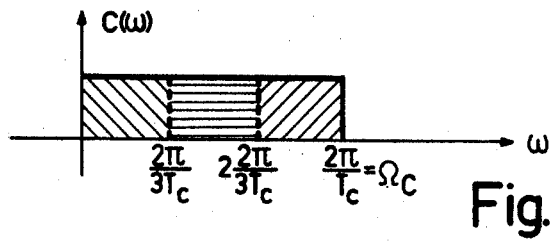
Figure 10:
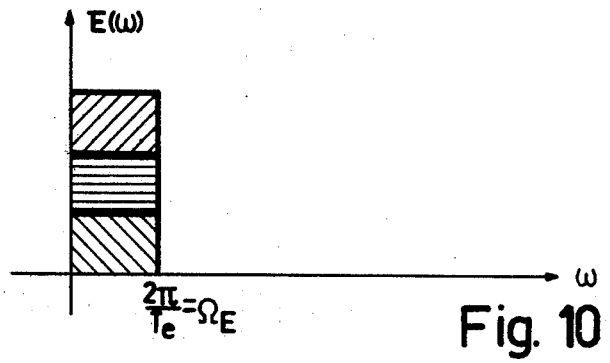

The above is diagrammatically depicted in the FIGS. 9 and 10.

The SRI-element shown symbolically in FIG. 3 and the SRR-element shown symbolically in FIG. 6 will not be found as a concrete circuit in the practical embodiments of the arrangements to be described but in combination with other elements. These SRI- and SRR-elements must be considered as mathematical elements which are exclusively used for simplifying the description of the operation of the various embodiments and for a better understanding thereof. For these reasons no practical circuit of these elements will be given here.

E(1.3) Sideband interchanging modulator

Figure 11:
FIG. 11 shows the symbol of a sideband interchanging modulator.
Figure 13:
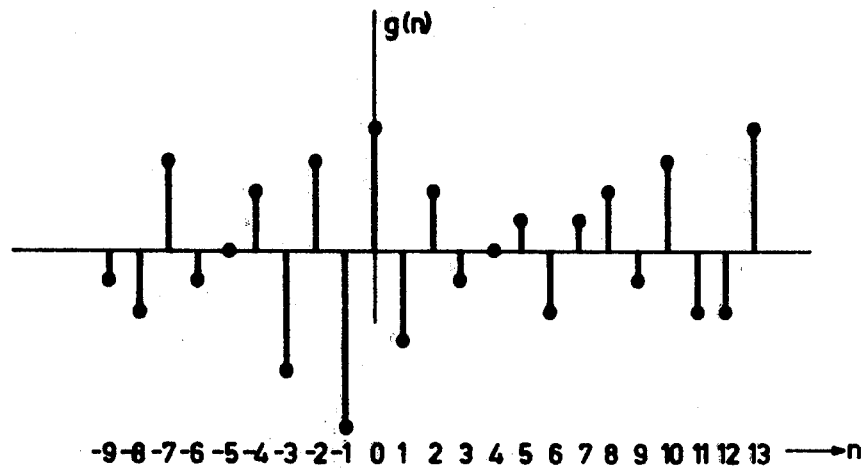

The arrangements to be described also utilize an element for interchanging the upper and lower sideband in the frequency spectrum of the digital signal applied to this element. This element will be represented by the symbol depicted in FIG. 11 and will be called sideband interchanging modulator. This sideband interchanging modulator operates as follows. Each time one out of two components of the input components f(n) of the modulator is multiplied by a factor-1. If, more in particular, the components f(n) depicted in FIG. 2 are applied to this modulator, the output components g(n) depicted in FIG. 13 are obtained. The operation of this sideband interchanging modulator can be described mathematically by the expression:

$$g(n) = (-1)^n f(n). \tag{13}$$

By substituting expression (13) in (4) it can be proved that the relation between the frequency spectrum $F(\omega)$ of $\{f(n)\}$ and the frequency spectrum $G(\omega)$ of $\{g(n)\}$ can be described mathematically by the expression:

$$G(\omega) = F\left[\omega - (2i-1)\frac{\pi}{T_f}\right]. \tag{14}$$

wherein ($1/T_f$) represents the sampling rate associated with both {f(n)} and {g(n)}. All this is diagrammatically depicted in FIGS. 14 and 15.

Figure 11A:
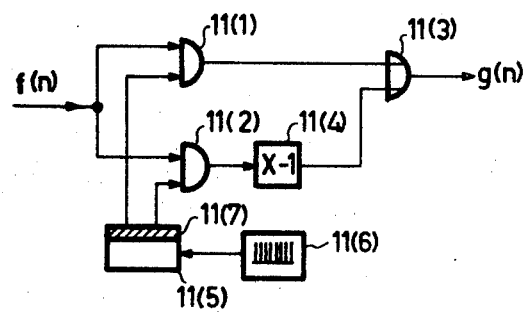
FIG. 11a shows an embodiment of a sideband interchanging modulator.
Figure 12:
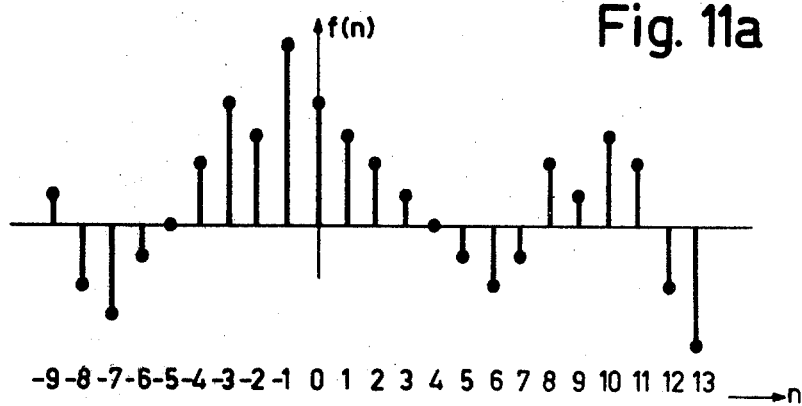

A possible embodiment of such a sideband interchanging modulator is shown in FIG. 11a. It comprises two AND-gates 11(1) and 11(2), an OR-gate 11(3), a multiplier 11(4), a modulo-2-counter 11(5) to which clock pulses are applied which are derived from a clock pulse generator 11(6). A decoding network 11(7) having two outputs is connected to the modulo-2-adder. Furthermore, the components f(n) which occur at a frequency $1/T_f$ are applied to both AND-gates, and the clock pulse frequency of said clock pulses is also equal to $1/T_f$. In response to a first of two successive clock pulses the AND-gate 11(1) is made conductive and the AND-gate 11(2) is cut off. In response to the second clock pulse of the second successive clock pulse the AND-gate 11(1) is cut off and the AND-gate 11(2) is made conductive. The output components f(n) of AND-gate 11(2) are multiplied by a factor $-1$ in the multiplier 11(4).

E(1.4) The complex modulator

Besides said sideband interchanging modulator in the arrangements to be described, also an element can be used for converting a real digital signal into a complex digital signal. This element can be represented by the symbol depicted in FIG. 16 and will be called complex modulator. In this complex modulator the components f(n) of the digital input signal, occurring at a rate $1/T_x$ are each multiplied by a factor $e^{j\omega_1 nT_f}$, to produce the complex digital output signal $p(n) = f(n)\cos(\omega_1 nT_f) + jf(n)\sin(\omega_1 nT_f)$. This complex signal comprises a real part Re [p(n)] and and an imaginary part Im [p(n)], wherein:

$$Re\ [p(n)] = f(n)\cos(\omega_1 nT_f)$$

$$Im\ [p(n)] = f(n)\sin(\omega_1 nT_f).$$

Figure 14:
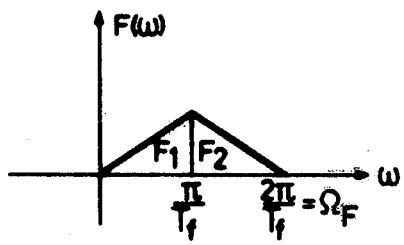

In a practical embodiment of such a modulator the components Re [p(n)] and Im [p(n)] are produced at separate outputs of the modulator. In practice this complex modulator can be constituted by that part of the digital Weaver modulator (see references 3, 4 and 5) which is depicted in FIG. 17 and which does not need any further explanation. For completeness' sake FIG. 18a shows symbolically some periods of the frequency spectrum P($\omega$) of the complex digital signal [p(n)], if the digital signal [f(n)] having the frequency spectrum depicted in FIG. 14 is applied to this complex modulator. This frequency spectrum P($\omega$) is mathematically given by the expression:

$$P(\omega) = F(\omega - \omega_1). \quad (15)$$

FIGS. 18b and 18c respectively show the frequency spectra $P^{(1)}(\omega)$ and $P^{(2)}(\omega)$ associated with the signals Re [p(n)] and Im [p(n)] produced by the arrangement depicted in FIG. 17. These frequency spectra can mathematically be expressed by:

$$P^{(1)}(\omega) = \frac{1}{2} F(\omega - \omega_1) + \frac{1}{2} F(\omega + \omega_1) \quad (16)$$

$$P^{(2)}(\omega) = \frac{1}{2j} F(\omega - \omega_1) - \frac{1}{2j} F(\omega + \omega_1).$$

E(2) THE TDM-FDM-ARRANGEMENT

E(2.1) Introduction

The digital TDM-FDM arrangement is an arrangement for converting N real baseband signals {$x_k(n)$}, with k = 1, 2, 3, ... N, into a real digital baseband single-sideband frequency divisionmultiplex signal {y(n)}. Let us suppose that the sampling period which is associated with each of N signals {$x_k(n)$} is equal to T. The frequency spectrum $X_k(\omega)$ of {$x_k(n)$} is diagrammatically depicted in FIG. 19, and it has a fundamental interval $\Omega_x = (2\pi/T)$. As {$x_k(n)$} is a real signal, $X_k(\omega)$ satisfies the relation:

$$X_k(\frac{2\pi}{T} - \omega_o) = X_k^*(\omega_o) \text{ for } 0 \leq \omega_o < \frac{\pi}{T}. \quad (17)$$

Suppose that the sampling rate associated with the desired real FDM signal {y(n)} is equal to ($1/T_y$), and that this sampling rate is an integral multiple of ($1/T$). So assume: $T_y = (T/M)$, wherein $M \geq N$, and wherein M is an integer. The fundamental interval $\Omega_y$ of the frequency spectrum of this FDM-signal therefor is equal to $\Omega_y = (2\pi M/T) = M\Omega_x$. As {y(n)} must be a real signal, the frequency spectrum Y($\omega$) of this FDM-signal must satisfy the relation $Y(\omega) = Y^*(2\pi M/T - \omega)$. Therefor, this frequency spectrum must have, in general, the form which is diagrammatically depicted in FIG. 20a for N = 4 and M = 5. The channel signals are each located in a subband $F_k$ of length ($\pi/T$), wherein k = 1, 2, 3, ... N. Each subband is characterized by the frequency range $\omega_1 + (k-1)\cdot(\pi/T) \leq \omega < \omega_1 + k\cdot(\pi/T)$. In what follows hereinafter it will be assumed that $0 \leq \omega_1 < (\pi/T)$. As Y($\omega$) must represent the frequency spectrum of a FDM-signal which comprises a frequency multiplex of N baseband signals {x(n)}, the following expressions must be satisfied:

$$Y\left[\omega_1 + \omega_o + (k-1)\frac{\pi}{T}\right] = X_k(\omega_o), \quad (18a)$$

and:

$$Y\left[\frac{2\pi}{T_y} - \left\{\omega_1 + \omega_o + (k-1)\frac{\pi}{T}\right\}\right] = \quad (18b)$$

$$Y^*\left[\omega_1 + \omega_o + (k-1)\frac{\pi}{T}\right] =$$

$$X_k^*(\omega_o) = X_k(\frac{2\pi}{T} - \omega_o).$$

It should be noted that for $\omega_1 = 0$, the value of M may be taken equal to N so: M = N, so that the frequency spectrum Y($\omega$) has the form depicted in FIG. 20b.

E(2.2) General implementation of the TDM-FDM-arrangement

FIG. 21 shows diagrammatically the implementation of a digital TDM-FDM arrangement for converting N real digital baseband signals {$x_k(n)$}, (k = 1, 2, 3, ... N; n = ... −2, −1, 0, +1, +2, ...), having associated therewith a sampling period T, into a real digital baseband single-sideband frequencydivision multiplex signal {y(n)} having associated therewith a sampling period $T_y = (T/M)$. This arrangement comprises an input circuit formed by N input channels 1(1), 1(2), 1(3), ..., 1(N). A digital baseband signal $\{x_k(n)\}$ is applied to each of these input channels. The frequency spectra of these signals follow from (4) and these spectra are shown in FIG. 19. For generating an FDM-signal having the frequency spectrum depicted in FIG. 20a for N = 4, a complex modulator 1(1,1), 1(1,2), ... 1(1,N) is included in each of the input channels, and the input channels having an even number are provided with a sideband interchanging modulator 2(1); 2(2); 2(3); ... 2(N/2). The input channels are connected to inputs of a transformation device 3. The digital signals generated by the input channels and being applied to the inputs of the transformation device 3 will be indicated by $\{r_k(n)\}$. The relationship between the components $r_k(n)$ and $x_k(n)$ can mathematically be given by the expression:

$$r_k(n) = x_k(n) \, e^{j\omega_1 nT} \text{ for k is odd}$$

$$r_k(n) = (-1)^n x_k(n) \, e^{j\omega_1 nT} \text{ for k is even.} \tag{19}$$

Figure 15:
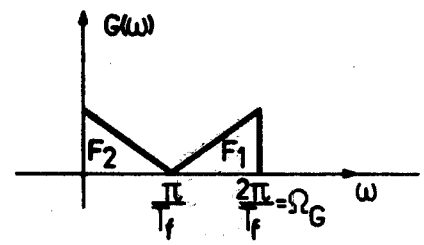

The frequency spectrum $R_k(\omega)$ of the digital signal $\{r_k(n)\}$ can be derived from (14) and (15), as well as from the FIGS. 14, 15 and 18a and is given by:

$$R_k(\omega) = X_k\left[\omega - \omega_1 - (k-1) \cdot \frac{\pi}{T}\right]. \tag{20}$$

For k is odd it applies that k−1 is even so that $$R_k(\omega) = X_k(\omega - \omega_1) \text{ for k = odd.}$$

For k is even it applies that k−1 is odd so that $$R_k(\omega) = X_k\left[\omega - \omega_1 - (k-1) \cdot \frac{\pi}{T}\right] \text{ for } k = \text{even}$$

$$= X_k\left[\omega - \omega_1 - \frac{\pi}{T}\right].$$

The spectrum defined by (20) is depicted in FIG. 22.

The transformation device 3 produces N digital signals $\{s_m(n)\}$, with m = 1, 2, 3, ... N, having associated therewith a sampling period T. These digital signals $\{s_m(n)\}$ are each applied to a signal channel 4(1), 4(2), .. 4(N). The processing operation which is performed by the transformation device 3 can mathematically be described by the expression:

$$s_m(n) = \sum_{k=1}^{N} a_{mk} \, r_k(n) \tag{21}$$
$$m = 1, 2, 3, \ldots N.$$

In this expression $a_{mk}$ represents a multiplication factor of constant value. This multiplication factor can be a real but also a complex number. If, in general, it is assumed that $a_{mk}$ is a complete number which can be given by:

$$a_{mk} = \alpha_{mk} + j\beta_{mk}, \tag{22}$$

then $s_m(n)$ also represents a complex number.

The general implementation of the transformer 3 as well as the general implementation of the signal channels 4(m) will be described in chapters E(2.4) and E(2.5). At this moment it is supposed that the complex signals $\{s_m(n)\}$ are available in a form which is suitable for further processing.

From (21) it is clear that each component $s_m(n)$ is formed by a linear combination of components $r_k(n)$. As a result of the linear character of (21) it applies that the frequency spectrum $S_m(\omega)$ of $\{s_m(n)\}$ is given by:

$$S_m(\omega) = \sum_{k=1}^{N} a_{mk} R_k(\omega). \tag{23}$$

The signal channels 4(1), 4(2), ... 4(N) each comprise a cascade arrangement of an SRI-element 5(1), 5(2), ... 5(N) and a digital filter 6(1), 6(2), ... 6(N) and are connected to inputs of an adder 7. In FIG. 21 the components of the output signal of the SRI-element 5(m) are indicated by $t_m(n)$; the components of the output signal of the digital filter 6(m) are indicated by $u_m(n)$; and the components of the output signal of the adder 7 are indicated by v(n). As $\{v(n)\}$, in general, represents a complex digital signal, and as we are only interested in a real digital output signal y(n) having the frequency spectrum $Y(\omega)$, which for N = 4 is depicted in FIG. 20a, the components v(n) are applied to a selector 8 which only produces the real portion of the complex component v(n) at its output.

In order to find a mathematical expression for the output signal $\{y(n)\}$ it should be noted that the relation between $t_m(n)$ and $s_m(n)$ is given by expression (8). From (10) it follows that the frequency spectrum $T_m(\omega)$ of $\{t_m(n)\}$ is given by:

$$T_m(\omega) = S_m(\omega) \tag{24}$$

$$\Omega_T = M\Omega_s = \frac{2\pi M}{T}$$

M being an integer and $M \geq N$.

The digital signal $\{t_m(n)\}$ is filtered in the filter 6(m). If the transfer function of the filter 6(m) is represented by $H_m(\omega)$, and the frequency spectrum of the signal $\{u_m(n)\}$ by $U_m(\omega)$, then it applies that:

$$U_m(\omega) = H_m(\omega) \cdot T_m(\omega) \tag{25}$$

m = 1, 2, 3, ... N.

The complex output signal $\{v(n)\}$ of this TDM-FDM arrangement is now obtained by adding the signals $\{u_m(n)\}$ together so that:

$$v(n) = \sum_{m=1}^{N} u_m(n) \tag{26}$$

and consequently:

$$y(n) = Re\left[\sum_{m=1}^{N} u_m(n)\right]. \tag{27}$$

The frequency spectrum $V(\omega)$ of $\{v(n)\}$ is given by:

$$V(\omega) = \sum_{m=1}^{N} U_m(\omega). \tag{28}$$

As (27) can be written in the form:

$$y(n) = Re\,[v(n)] = \tfrac{1}{2}\,[v(n) + v^*(n)], \tag{29}$$

wherein v*(n) represents the complex conjugate of v(n) and as the frequency spectrum of $\{v(n)\}$, is equal to $V(\omega)$, so that the frequency spectrum of $\{v^*(n)\}$ is equal to $V^*(2\pi/T_y - \omega)$ it holds that:

$$Y(\omega) = \frac{1}{2}\left[ V(\omega) + V^*\left(\frac{2\pi}{T_y} - \omega\right) \right]. \quad (30)$$

E(2.3) The FDM-conditions

In order to generate an SSB-FDM-signal having the frequency spectrum $Y(\omega)$, which for $N = 4$ is depicted in FIG. 20a, the transfer function $H_m(\omega)$ of the filter 6(m) must satisfy a very special condition. This condition will be called "FDM-condition" and will now be further indicated.

From (25) and (28) it follows that:

$$V(\omega) = \sum_{m=1}^{N} H_m(\omega) \cdot T_m(\omega). \quad (31)$$

From (31) and (24) it follows that:

$$V(\omega) = \sum_{m=1}^{N} H_m(\omega) \cdot S_m(\omega). \quad (32)$$

From (32) and (23) it follows that:

$$V(\omega) = \sum_{m=1}^{N} H_m(\omega) \sum_{k=1}^{N} a_{mk} R_k(\omega). \quad (33)$$

From (33) and (20) it follows that:

$$V(\omega) = \sum_{m=1}^{N} H_m(\omega) \sum_{k=1}^{N} a_{mk} X_k\left[ \omega - \omega_1 - (k-1)\frac{\pi}{T} \right]. \quad (34)$$

Equation (34) can also be written in the form:

$$V(\omega) = \sum_{k=1}^{N} X_k\left[ \omega - \omega_1 - (k-1)\frac{\pi}{T} \right] \sum_{m=1}^{N} a_{mk} H_m(\omega), \quad (35)$$

so that:

$$V^*(\Omega_y - \omega) = \sum_{k=1}^{N} X_k^*\left[ \Omega_y - \omega - \omega_1 - (k-1)\frac{\pi}{T} \right] \cdot \sum_{m=1}^{N} a_{mk}^* H_m^*(\Omega_y - \omega) \quad (36)$$

As $\Omega_y = M\Omega_x = M(2\pi/T)$, from (30), (35) and (36) it follows that:

$$Y(\omega) = \frac{1}{2} \sum_{k=1}^{N} X_k\left[ \omega - \omega_1 - (k-1)\frac{\pi}{T} \right] \cdot \sum_{m=1}^{N} a_{mk} H_m(\omega) + \frac{1}{2} \sum_{k=1}^{N} X_k^*\left[ \omega + \omega_1 - (k-1)\frac{\pi}{T} \right] \cdot \sum_{m=1}^{N} a_{mk}^* H_m^*(\Omega_y - \omega), \quad (37)$$

As can be easily verified $Y(\omega)$ as defined in (37) indeed satisfies the condition (6) relating to a real output signal $\{y(n)\}$. From (37) it follows indeed that:

$$Y(\Omega_y - \omega) = Y(\omega).$$

Therefore it is sufficient to investigate which condition the transfer function $H_m(\omega)$ must satisfy in the various subbands $F_i$ of bandwidth $(\pi/T)$ ($i = 1, 2, 3, \ldots N$) in order to obtain the desired frequency spectrum $Y(\omega)$. Suppose $$\omega = \omega_o + \omega_1 + (i-1)\frac{\pi}{T}$$

with $0 \leq \omega_o < \frac{\pi}{T}$ and $i = 1, 2, 3, \ldots N.$

Then (37) passes into:

$$Y\left[ \omega_o + \omega_1 + (i-1)\frac{\pi}{T} \right] = \frac{1}{2} \sum_{k=1}^{N} X_k\left[ \omega_o + (i-k)\frac{\pi}{T} \right] \cdot \sum_{m=1}^{N} a_{mk} H_m\left[ \omega_o + \omega_1 + (i-1)\frac{\pi}{T} \right] + \frac{1}{2} \sum_{k=1}^{N} X_k^*\left[ \omega_o + 2\omega_1 + (i-k)\frac{\pi}{T} \right] \cdot \sum_{m=1}^{N} a_{mk}^* H_m^*\left[ M \cdot \frac{2\pi}{T} - \left(\omega_o + \omega_1 + (i-1)\frac{\pi}{T}\right) \right]. \quad (38)$$

In accordance with (18a) the expression:

$$Y\left[ \omega_o + \omega_1 + (i-1)\frac{\pi}{T} \right] = X_i(\omega_o) \quad (39)$$

must now be satisfied.

Two situations can now be distinguished, namely the situations:
1. $\omega_1 = 0$
2. $\omega_1 \neq 0$ 1. The situation $\omega_1 = 0$ means that the TDM-FDM arrangement shown in FIG. 21 is arranged for generating the SSB-FDM signal having the frequency spectrum which is depicted in FIG. 20b. As has already been remarked in chapter E(2.1) the increase factor M of the SRI-elements can now be chosen to be equal to N so: $M = N$. With these data it follows from (38) that:

$$Y\left[ \omega_o + (i-1)\frac{\pi}{T} \right] = \frac{1}{2} \sum_{k=1}^{N} X_k\left[ \omega_o + (i-k)\frac{\pi}{T} \right] \cdot \sum_{m=1}^{N}\left\{ a_{mk} H_m\left[ \omega_o + (i-1)\frac{\pi}{T} \right] + a_{mk}^* H_m^*\left[ M \cdot \frac{2\pi}{T} - \left(\omega_o + (i-1)\frac{\pi}{T}\right) \right] \right\} \quad (40)$$

As the relation (see (39))

$$Y\left[\omega_o + (i-1)\frac{\pi}{T}\right] = X_i(\omega_o)$$

must now be satisfied (see (39)), we obtain from (40) the FDM-condition for $\omega_1 = 0$:

$$\frac{1}{2} \sum_{m=1}^{N} \left\{ a_{mk} H_m \left[ \omega_o + (i-1)\frac{\pi}{T} \right] + a^*_{mk} H^*_m \left[ M\frac{2\pi}{T} - \left( \omega_o + (i-1)\frac{\pi}{T} \right) \right] \right\} = \delta_{ki}. \quad (41)$$

2. The situation $\omega_1 \neq 0$ means that the TDM-FDM arrangement shown in FIG. 21 is arranged for generating the SBB-FDM signal having the frequency spectrum which is depicted in FIG. 20a. In this case (38) can only satisfy (39) if the FDM-condition for $\omega_1 \neq 0$ satisfies equation which read as follows:

$$H^*_m\left[ M\cdot\frac{2\pi}{T} - \left( \omega_o + \omega_1 + (i-1)\frac{\pi}{T} \right) \right] = 0 \quad (42)$$

$$\frac{1}{2} \sum_{m=1}^{N} a_{mk} H_m \left[ \omega_o + \omega_1 + (i-1)\frac{\pi}{T} \right] = \delta_{ki}.$$

In (41) and (42), $\delta_{ki}$ represents the Kronecker symbol with, which is defined as follows:

$\delta_{ki} = 0$ for $k \neq i$
$\quad\quad = 1$ for $k = i$. \quad (43)

Although the frequency spectrum of the FDM signal within the frequency range $0 \leq \omega < M(2\pi/T)$ is taken into account only to derive the expressions (41) and (42), these expressions are valid for any arbitrary frequency range $\alpha M\cdot(2\pi/T) \leq \omega < (\alpha + 1) M\cdot(2\pi/T)$. This follows from the fact that both $Y(\omega)$ and $H_m(\omega)$ are periodic functions with period $M\cdot(2\pi/T)$, so that expression (5) applies. Consequently, the FDM-condition (41) might also be written in the equivalent form:

$$\frac{1}{2} \sum_{m=1}^{N} \left\{ a_{mk} H_m \left[ \alpha N\cdot\frac{2\pi}{T} + \left( \omega_o + \omega_1 + (i-1)\frac{\pi}{T} \right) \right] + a^*_{mk} H^*_m \left[ (\alpha + 1)\cdot N\cdot\frac{2\pi}{T} - \left( \omega_o + \omega_1 + (i-1)\frac{\pi}{T} \right) \right] \right\} = \delta_{ki}, \quad (44)$$

wherein $\alpha$ represents an integer.

The multiplication factors $a_{mk}$ may be considered as the elements of a $N\times N$-matrix $A^{(N)}$. Herein $N$ indicates the order of the matrix. This matrix then has the form:

$$A^{(N)} = [a_{mk}] = \begin{pmatrix} a_{11} & a_{12} & a_{13} & \cdots & a_{1N} \\ a_{21} & a_{22} & a_{23} & \cdots & a_{2N} \\ \vdots & & & & \\ a_{N1} & a_{N2} & a_{N3} & \cdots & a_{NN} \end{pmatrix} \quad (45)$$

and will be called transformation-matrix.

As $0 \leq \omega_o < (\pi/T)$, the function $H_m[\omega_o + \omega_1 + (i-1)(\pi/T)]$, which is part of expression (38), describes the transfer function $H_m(\omega)$ over the frequency range $\omega_1 + (i-1)\cdot(\pi/T) \leq \omega < \omega_1 + i\cdot(\pi/T)$. These functions may be considered to be elements of a $N\times N$-matrix $H(\omega_o)$. This matrix has the form:

$$H(\omega_o) = \begin{pmatrix} H_1(\omega_o + \omega_1) & H_1(\omega_o + \omega_1 + \frac{\pi}{T}) & \cdots & H_1[\omega_o + \omega_1 + (N-1)\frac{\pi}{T}] \\ H_2(\omega_o + \omega_1) & H_2(\omega_o + \omega_1 + \frac{\pi}{T}) & \cdots & H_2[\omega_o + \omega_1 + (N-1)\frac{\pi}{T}] \\ \vdots & & & \\ H_N(\omega_o + \omega_1) & H_N(\omega_o + \omega_1 + \frac{\pi}{T}) & \cdots & H_N[\omega_o + \omega_1 + (N-1)\frac{\pi}{T}] \end{pmatrix} \quad (46)$$

and will be called transfer-matrix.

In a similar manner $$H_m\left[ M\frac{2\pi}{T} - \left( \omega_o + \omega_1 + (i-1)\frac{\pi}{T} \right) \right] \text{ with } i = 1, 2, 3, \ldots, N$$

describes the transfer function $H_m(\omega)$ over the frequency range $$(2M - i)\frac{\pi}{T} - \omega_1 \leq \omega < (2M - i + 1)\frac{\pi}{T} - \omega_1.$$

These last-mentioned functions may be considered to be elements of an $N\times N$-matrix $H(M\cdot(2\pi/T) - \omega_o)$. This matrix has the form:

$$H(2M\tfrac{\pi}{T} - \omega_o) = \quad (47)$$

$$\begin{pmatrix} H_1[2M\tfrac{\pi}{T} - \omega_1 - \omega_o] & H_1[(2M-1)\tfrac{\pi}{T} - \omega_1 - \omega_o] & \cdots & H_1[(2M-N+1)\tfrac{\pi}{T} - \omega_1 - \omega_o] \\ H_2[2M\tfrac{\pi}{T} - \omega_1 - \omega_o] & H_2[(2M-1)\tfrac{\pi}{T} - \omega_1 - \omega_o] & \cdots & H_2[(2M-N+1)\tfrac{\pi}{T} - \omega_1 - \omega_o] \\ \vdots & & & \\ H_N[2M\tfrac{\pi}{T} - \omega_1 - \omega_o] & H_N[(2M-1)\tfrac{\pi}{T} - \omega_1 - \omega_o] & \cdots & H_N[(2M-N+1)\tfrac{\pi}{T} - \omega_1 - \omega_o] \end{pmatrix}$$

If in the expressions (46) and (47) it is supposed that $\omega_1 = 0$, then the FDM-condition (41) for $\omega_1 = 0$ can be written in the form:

$$A^{(N)T} \cdot H(\omega_o) + (A^{(N)*})^T \cdot H^*(2M\tfrac{\pi}{T} - \omega_o) = 2I_N. \quad (48)$$

With (46) and (47) the FDM-condition (42) for $\omega_1 \neq 0$ can now be written in the form:

$$H(2M\tfrac{\pi}{T} - \omega_o) = 0 \quad (49)$$

$$A^{(N)T} \cdot H(\omega_o) = 2I_N.$$

In the expressions (48) and (49):
$A^{(N)T}$ represents the transposed matrix of $A^{(N)}$;
$A^{(N)*}$ represents the complex conjugate matrix of $A^{(N)}$; and
$I_N$ represents the N×N-identity matrix.

When deducing the two FDM-conditions (41) and (42), it was assumed that the FDM-signal satisfies (39). If, however, a given amplitude and phase distortion is allowed for the channel signal in the SSB-FDM signal relative to the original baseband signal, then this can be expressed by writing (39) in the form:

$$Y[\omega_o + \omega_1 + (i-1)\pi/T] = X_i(\omega_o) \cdot \psi_i(\omega_o). \quad (50)$$

Herein $\psi_i(\omega_o)$ represents a function of $\omega_o$. This amplitude and phase distortion can now also be expressed in the FDM-condition, namely by replacing in expressions (41) and (42) $\delta_{ki}$ by $\delta_{ki} \cdot \psi_i(\omega_o)$. Or by replacing in expressions (48) and (49) $I_N$ in diag $[\psi_i(\omega_o)]$. Herein diag $[\psi_i(\omega_o)]$ is defined as follows:

$$\operatorname{diag}[\psi_i(\omega_o)] = \begin{pmatrix} \psi_1(\omega_o) & 0 & 0 & 0 & \cdots & 0 \\ 0 & \psi_2(\omega_o) & 0 & 0 & \cdots & 0 \\ 0 & 0 & \psi_3(\omega_o) & 0 & \cdots & 0 \\ \vdots & & & & & \\ 0 & 0 & 0 & 0 & \cdots & \psi_N(\psi_o) \end{pmatrix} \quad (51)$$

When deducing the expressions (41) and (42), it was assumed that the output signal y(n) of the TDM-FDM arrangement is formed by the signal Re [v(n)]. It will be clear that also the signal Im [v(n)] could be taken as the output signal of this TDM-FDM arrangement. The two FDM-conditions (48) and (49) apply also for this choice of the output signal.

E(2,4) The transformation device

The transformation device 3 of FIG. 21 is arranged for performing the operations defined in (21). This transformation device is based on the matrix $A^{(N)}$ defined in (45). As the matrix $A^{(N)}$ is of the N-order, the transformation-device will be indicated as N-point transformer. In agreement herewith the TDM-FDM-arrangement, which is provided with a N-point transformer, will be indicated as N-point TDM-FDM arrangement.

When the multiplication factors $a_{mk}$ in expression (21) are given by (22), then (21) can be written in the form:

$$s_m(n) = \sum_{k=1}^{N} \alpha_{mk} \cdot r_k(n) + j \sum_{k=1}^{N} \beta_{mk} \cdot r_k(n) \quad (52)$$
$$m = 1, 2, 3 \ldots N.$$

Thus the component $s_m(n)$ has a real portion and an imaginary portion. If the real portion of $s_m(n)$ is represented by Re $[s_m(n)]$, and the imaginary portion by Im $[s_m(n)]$, then it holds that:

$$s_m(n) = Re\,[s_m(n)] + j\,Im\,[s_m(n)],$$

wherein:

$$Re\,[s_m(n)] = \sum_{k=1}^{N} \alpha_{mk} \cdot r_k(n) \quad (53)$$

$$Im\,[s_m(n)] = \sum_{k=1}^{N} \beta_{mk} \cdot r_k(n).$$

To be able to process a complex signal, the real portion and the imaginary portion of this signal must be available separately. FIG. 23 now shows a transformation-device which is arranged for generating the components, defined in (53), in case N=2 and its input signals are real. This two-point transformer comprises two inputs 1(1) and 1(2). Connected to each of these inputs there are four multipliers 9($\gamma$), 10($\gamma$) ($\gamma$ = 1,2,3,4) which multiply the input components $r_1(n)$ and $r_2(n)$ applied thereto by the multiplication factors $\alpha_{mk}$ and $\beta_{mk}$.

The outputs of the multipliers are connected in the way shown in the Figure to inputs of adders 11($\gamma$) with $\gamma$ = 1,2,3,4, the outputs whereof form the outputs of the transformation-device. The adder 11(1) produces the real part Re $[s_1(n)]$ of $s_1(n)$ and the adder 11(2) the imaginary part Im $[s_1(n)]$ of $s_1(n)$.

Following the above teachings, it is simple to deduce the implementation of a transformation-device in case N > 2. The implementation thus obtained is usually called the "direct implementation" (of expression (52)).

The transformation-device of FIG. 23 is actually a special embodiment of a general transformation-device which is arranged for converting complex input components into complex output components, and which is based on a transformation matrix whose elements are complex numbers. If it is assumed that the input components $r_k(n)$ are given by $$r_k(n) = Re\,[r_k(n)] + j\,Im\,[r_k(n)],$$

and that the multiplication factors $a_{mk}$ are again given by (22), then (21) can be written as in the form:

$$s_m(n) = \sum_{k=1}^{N} \{\alpha_{mk} \cdot Re\,[r_k(n)] - \beta_{mk} \cdot Im\,[r_k(n)]\} + j \sum_{k=1}^{N} \{\alpha_{mk} \cdot Im\,[r_k(n)] + \beta_{mk} \cdot Re\,[r_k(n)]\} \quad (54)$$

$$s_m(n) = Re\,[s_m(n)] + j\,Im\,[s_m(n)].$$

In FIG. 24 this general transformation-device is shown for the case N = 2. This general two-point transformer is provided with four inputs 1(1,1), 1(1,2), 1(2,1) and 1(2,2) which are each connected to inputs of four multipliers 12($\gamma$), 13($\gamma$), 14($\gamma$) and 15($\gamma$) with $\gamma$ = 1,2,3,4 which multiply the input components applied thereto by the multiplication factors $\alpha_{mk}$, $\beta_{mk}$, $-\beta_{mk}$. The outputs of these multipliers are furthermore connected to inputs of adders 16($\gamma$) with $\gamma$ = 1,2,3,4, whose outputs again constitute the outputs of the transformation-device.

Following the above teaching it is again simple to deduce the implementation of the general transformation-device in case N > 2.

From the above it follows that the number of complex multiplications which must be performed in the transformation-device in order to calculate one output component y(n) of the TDM-FDM arrangement, is equal to $N^2$. For the evaluation of expression (52) this means $2N^2$ real multiplications, and for the evaluation of expression (54) this means $4N^2$ real multiplications. The complexity of the TDM-FDM arrangement is now *inter alia* determined by the value of N.

In a manner reminiscent of the discrete fourier transform (DFT), (see reference 13) a transformation-device, whose operation is fully described by a matrix, can be implemented in given circumstances in such a way that the number of multiplications to be performed is drastically reduced. A transformation-device implemented in such a manner will be called "fast transformation-device". The fast transformation-device for calculating the discrete fourier transform is, for example, known as "Fast Fourier Transformer "(FFT)".

Such a fast transformation-device may, for example, be implemented using two-point transformers which are based on a matrix $A_{iz}^{(2)}$ and which are each implemented in the manner as, for example, shown in FIG. 23 or 24. The two-point transformer of FIG. 23 and of FIG. 24 respectively will hereinafter be indicated by the symbol shown in FIG. 25 and FIG. 26 respectively. In these drawings the associated transformation matrices are indicated by $A_{iz}^{(2)}$ and this matrix is given by:

$$A_{iz}^{(2)} = \begin{pmatrix} a_{iz,11} & a_{iz,12} \\ a_{iz,21} & a_{iz,22} \end{pmatrix}. \quad (55)$$

FIG. 27 shows for completeness' sake an eight-point fast transformation-device which is suitable for use in the arrangement of FIG. 21. The implementation of this transformation-device is based on two-point transformers of the type shown in FIG. 24 and FIG. 26 respectively. These transformers are interconnected in a manner shown in the figure. The transformers 3(1), 3(2), 3(3) and 3(4) are based on the matrices $A_{11}^{(2)}$, $A_{21}^{(2)}$, $A_{31}^{(2)}$ and $A_{41}^{(2)}$ respectively. Each of the transformers 3(5,1) and 3(5,2) is based on the matrix $A_{52}^{(2)}$. The last-mentioned transformers may be considered as a transformer 3(5) which is based on a matrix which will be symbolically indicated by $2 \times A_{52}^{(2)}$. Each of the transformers 3(6,1) and 3(6,2) is based on the matrix $A_{62}^{(2)}$, so that also these transformers may be considered as a transformer 3(6), which is based on a matrix, which will be indicated, again symbolically, by $2 \times A_{62}^{(2)}$. Each of the transformers 3(7,1), 3(7,2), 3(7,3) and 3(7,4) is based on the matrix $A_{73}^{(2)}$, so that these transformers together may be considered as a transformer 3(7), which is based on a matrix, which will be indicated symbolically by $4 \times A_{73}^{(2)}$. It should be noted that in, the symbol $A_{iz}^{(2)}$ the index z indicates the column in which the relevant transformer can be found (cf. FIG. 27).

It is noted that the implementation of a fast transformation device can also be based on, for example, four-point transformers, each of which is based on a matrix $A_{iz}^{(4)}$. For its equivalent for the DFT, reference is again made to reference 13.

E(2.5) The signal channel

E(2.5.1) General implementation

In chapter E(2.3) it was assumed that the transformation device 3 produces complex signal components $s_m(n)$ having a real part Re $[s_m(n)]$ and an imaginary part Im $[s_m(n)]$ so that:

$$s_m(n) = Re\,[s_m(n)] + j\,Im\,[s_m(n)].$$

These signal components are applied to the SRI-elements whose complex output signal components $t_m(n)$ may be represented by $$t_m(n) = Re\,[t_m(n)] + j\,Im\,[t_m(n)].$$

In the digital filter 6(m) these components $t_m(n)$ are convolved with the impulse response $h_m(n)$, so that:

$$u_m(n) = t_m(n) * h_m(n), \quad (56)$$

wherein $$u_m(n) = Re\,[u_m(n)] + j\,Im\,[u_m(n)] \quad (57)$$

In general, $H_m(\omega)$ will be unequal to $H_m^*(M \cdot 2\pi/T - \omega)$. This means that the impulse response $h_m(n)$ is complex which will be represented as follows:

$$h_m(n) = h_{mp}(n) + j\,h_{mq}(n). \quad (58)$$

Herein $h_{mp}(n)$ and $h_{mq}(n)$ represent real impulse responses.

For the further analysis of the transfer function $H_m(\omega)$, transfer functions $H_{mp}(\omega)$ and $H_{mq}(\omega)$ are introduced. Herein it is assumed that $h_{mp}(n)$ represents the impulse response of a digital filter having the transfer function $H_{mp}(\omega)$, and that $h_{mq}(n)$ represents the pulse response of a digital filter having the transfer function $H_{mq}(\omega)$, so that:

$$H_m(\omega) = H_{mp}(\omega) + j\,H_{mq}(\omega) \quad (59)$$

and:

$$H_{mp}(\omega) = \frac{1}{2}\,[[H_m(\omega) + [H_m^* (2M\frac{\pi}{T} - \omega)] \quad (60)$$

$$H_{mq}(\omega) = \frac{1}{2j}\,[H_m(\omega) - H_m^*(2M\frac{\pi}{T} - \omega)].$$

The transfer matrices (46) and (47) can now be written respectively as:

$$H(\omega_o) = H_p(\omega_o) + j H_q(\omega_o) \tag{61}$$

$$H(2M\tfrac{\pi}{T} - \omega_o) = H_p^*(\omega_o) + j H_q^*(\omega_o),$$

wherein in a corresponding manner as in (46):

$$H_p(\omega_o) = \begin{pmatrix} H_{1p}(\omega_o + \omega_1) & H_{1p}(\omega_o + \omega_1 + \tfrac{\pi}{T}) & \cdots & H_{1p}[\omega_o + \omega_1 + (N-1)\tfrac{\pi}{T}] \\ H_{2p}(\omega_o + \omega_1) & H_{2p}(\omega_o + \omega_1 + \tfrac{\pi}{T}) & \cdots & H_{2p}[\omega_o + \omega_1 + (N-1)\tfrac{\pi}{T}] \\ \vdots & & & \\ H_{Np}(\omega_o + \omega_1) & H_{Np}(\omega_o + \omega_1 + \tfrac{\pi}{T}) & \cdots & H_{Np}[\omega_o + \omega_1 + (N-1)\tfrac{\pi}{T}] \end{pmatrix} \tag{62}$$

$$H_q(\omega_o) = \begin{pmatrix} H_{1q}(\omega_o + \omega_1) & H_{1q}(\omega_o + \omega_1 + \tfrac{\pi}{T}) & \cdots & H_{1q}[\omega_o + \omega_1 + (N-1)\tfrac{\pi}{T}] \\ H_{2q}(\omega_o + \omega_1) & H_{2q}(\omega_o + \omega_1 + \tfrac{\pi}{T}) & \cdots & H_{2q}[\omega_o + \omega_1 + (N-1)\tfrac{\pi}{T}] \\ \vdots & & & \\ H_{Nq}(\omega_o + \omega_1) & H_{Nq}(\omega_o + \omega_1 + \tfrac{\pi}{T}) & \cdots & H_{Nq}[\omega_o + \omega_1 + (N-1)\tfrac{\pi}{T}] \end{pmatrix} \tag{63}$$

The transfer matrices $H_p(2M\pi/T - \omega_o)$ and $H_q(2M\pi/T - \omega_o)$ can be defined in accordance with (47).

The implementation of a digital filter with complex impulse response now follows directly from (56), (57) and (58). From these expressions it follows that:

$$Re\,[u_m(n)] = Re\,[t_m(n)]^* \, h_{mp}(n) - Im\,[t_m(n)]^* \, h_{mq}(n) \tag{64}$$

$$Im\,[u_m(n)] = Re\,[t_m(n)]^* \, h_{mq}(N) + Im\,[t_m(n)]^* \, h_{mp}(n).$$

The complete implementation of the signal channel 4(m) is shown in FIG. 28.

In chapter E(2.4) it is already described that the transformation-device 3 produces the real part Re $[s_m(n)]$ and the imaginary part Im $[s_m(n)]$ of $s_m(n)$ on separate outputs. For processing this complex signal $\{s_m(n)\}$ in the signal channel 4(m) this signal channel comprises two auxiliary channels 4(m,1) and 4(m,2) to which the signals Re $[s_m(n)]$ and Im $[s_m(n)]$ are applied respectively (see FIG. 28). Each of these auxiliary channels comprises an SRI-element 5(m,1) and 5(m,2) respectively, at the outputs of which the real part Re $[t_m(n)]$ and the imaginary part Im $[t_m(n)]$ of the complex signal $[t_m(n)]$ are produced respectively. Said last outputs are furthermore connected to inputs of the digital filter 6(m). In general this filter comprises four realizable digital filters 6(m,1), 6(m,2), 6(m,3) and 6(m,4) having the transfer functions $H_{mp}(\omega)$, $H_{mq}(\omega)$, $-H_{mq}(\omega)$ and $H_{mp}(\omega)$ respectively. As shown in the Figure, the inputs of these filters are connected to the outputs of the SRI-elements 5(m,1) and 5(m,2). The outputs of the filters 6(m,.) are connected to inputs of two adders 6(m,5) and 6(m,6), whose outputs 6(m,7) and 6(m,8) constitute the outputs of the digital filter 6(m). At the output 6(m,7), the real signal Re $[u_m(n)]$ is produced, and at the output 6(m,8), the real signal Im $[u_m(n)]$, which signals represent the real and the imaginary part respectively of the signal $\{u_m(n)\}$.

E(2.5.2) The transfer matrices $H_p(\omega_o)$ and $H_q(\omega_o)$

To determine the transfer functions $H_{mp}(\omega)$ and $H_{mq}(\omega)$, we will start, for simplicity, from the expressions (48) and (49), wherein the amplitude and phase distortion factor $\psi_i(\omega_o)$ will be assumed to be equal to unity. At the same time, it will be assumed that the FDM-signal is formed by the signal Re $[v(n)]$. For the cases not considered here, which are indicated in chapter E(2.3), what follows here below proceeds in a similar manner.

In the first place the transfer matrices $H_p(\omega_o)$ and $H_q(\omega_o)$ will be determined for the TDM-FDM arrangements with $\omega_1 \neq 0$, for which the FDM-condition (49) applies. It now follows from (61) and (49) that:

$$H_q(\omega_o) = \tfrac{1}{j} H_p(\omega_o),$$

so that:

$$H_p(\omega_o) = \tfrac{1}{2} (A^{(N)T})^{-1} \tag{65}$$

$$H_p(2M\tfrac{\pi}{T} - \omega_o) = H_p^*(\omega_o) = \tfrac{1}{2} (A^{(N)T*})^{-1}$$

$$H_q(\omega_o) = \tfrac{1}{2j} (A^{(N)T})^{-1}$$

$$H_q(2M\tfrac{\pi}{T} - \omega_o) = -\tfrac{1}{2j} (A^{(N)T*})^{-1}.$$

From (65) it follows that the transfer function $H_{mq}(\omega)$ with $0 \leq \omega < 2M(\pi/T)$ represents the Hilbert transform of $H_{mp}(\omega)$. The resulting implementation of the signal channel is shown in FIG. 28a. It should be noted that in (65) the transformation matrix A is assumed, in general, to be complex. If, this matrix A is real, then the implementation of the signal channel remains, however, the same as that shown in FIG. 28a. It should also be noted that the matrix $A^{(N)T}$ is not assumed to be singular.

In the second place, the transfer matrixes $H_p(\omega_o)$ and $H_q(\omega_o)$ will be determined for the FDM-arrangement with $\omega_1 = 0$, for which the FDM-condition (48) applies. This FDM-condition (48) represents an equation which for a given transform matrix $A^{(N)}$ comprises two unknown transfer matrixes. To be able to determine these transfer matrices unambiguously, suitably chosen additional conditions can be imposed on either the transfer matrices or the transformer matrix. In what follows hereinafter three possible additional conditions will be mentioned by way of example.

1. A first additional condition, is, for example, $$H(\omega_o) = H^*(2M\frac{\pi}{T} - \omega_o). \tag{66}$$

From (60) it then follows that:

$$H_q(\omega_o) = 0$$

with (66) the FDM-condition (48) changes into:

$$(A^{(N)T} + A^{(N)*T}) \cdot H_p(\omega_o) = 2I_N.$$

If the transformer matrix is further given by:

$$A(N) = Re\ [A^{(N)}] + j\ Im\ [A^{(N)}],$$

then it holds that:

$$H_p(\omega_o) = (Re\ [A^{(N)T}])^{-1}, \tag{67}$$

and that: $H_p(2M\frac{\pi}{T} - \omega_o) = \{(Re\ [A^{(N)T}])^{-1}\}^*.$

Herewith it is assumed that the matrix Re $[A^{(N)T}]$ is not singular. The implementation of the signal channel resulting from this additional condition follows from FIG. 28 and is shown in FIG. 28b.

2. As additional condition, it might also be assumed that the transformer matrix comprises real elements only. This means that:

$$Im\ [A^{(N)}] = 0\ A^{(N)*} = A^{(N)}, \tag{68}$$

so that:

$$Im\ [s_m(n)] = 0$$

$$\beta mk = 0.$$

The FDM-condition (48) now changes into:

$$A^{(N)T} \cdot \left[ H(\omega_o)\ H^*(2M\frac{\pi}{T} - \omega_o) \right] = 2I_N.$$

With (60) it follows that:

$$H_p(\omega_o) = [A^{(N)T}]^{-1} \tag{69}$$

$$H_p(2M\frac{\pi}{T} - \omega_o) = \{[A^{(N)T}]^{-1}\}^*$$

$$H_q(\omega_o) = H_q^*(2M\frac{\pi}{T} - \omega_o) = \text{arbitrary}.$$

If this second additional condition is combined with the condition sub 1., that is to say if $H_q(\omega_o) = 0$, then the signal channel shown in FIG. 28 changes into the signal channel shown in FIG. 28c.

3. A further additional condition, is, for example, $$H^*(2M\frac{\pi}{T} - \omega_o) = 0. \tag{70}$$

Herewith and with (65) the FDM-condition for $\omega_1 = 0$ changes into:

$$A^{(N)T} \cdot H(\omega_o) = 2I_N. \tag{71}$$

The set of equations (70) and (71) is closely related to the set of equations defined in (49), so that for this third additional condition a set of expressions related to (69) is applicable. The signal channel is again implemented in the manner shown in FIG. 28a.

From the above it follows that the FDM-condition (49) for $\omega_1 \neq 0$ may be considered as a special case of the FDM-condition (48) for $\omega_1 = 0$. This can also be interpreted as follows: if the transfer function $H_m(\omega)$ of the digital filter 6(m) with m = 1, 2, 3, ....N is chosen such that the modulus of $H_m(\omega)$ is equal to zero, that is to say $|H_m(\omega)| = 0$ in the range $M(\pi/T) \leq \omega < 2M(\pi/T)$, a frequency shift $\omega_1$ is still permissible for the FDM-signal within its fundamental period, provided M is taken greater than N (cf. the FIGS. 20b and 20a).

It should be noted that with the help of the general theory which is available therefore (see for example reference 14), a digital filter having a given transfer function can always be implemented. Consequently, in what follows hereinafter the specific implementation of a digital filter having a given transfer function will not be discussed.

E(2.6) Simplification of the TDM-FDM arrangement

In the transformation device 3 of the TDM-FDM arrangement shown in FIG. 21, $N^2$ multiplication factors $a_{mk}$ are used. As has already been remarked, the complexity of the TDM-FDM arrangement is determined inter alia by the value of N. This complexity is also determined by the value of the sampling rate (M/T) with which digital signal components $t_m(n)$ are applied to the digital filter 6(m). This sampling rate determines the complexity of this digital filter. For this reason, if $\omega_1 = 0$ the increase factor M is taken equal to N.

If N is even, a considerable simplification of the TDM-FDM arrangement can yet be obtained in the manner shown symbolically in FIG. 29. This TDM-FDM arrangement comprises three TDM-FDM sub-arrangements 17, 18 and 19. Each of these TDM-FDM sub-arrangements is implemented in the manner which is identical to the TDM-FDM arrangement shown in FIG. 21. However, the sub-arrangements 17 and 18 are (N/2)-point TDM-FDM arrangements, and the sub-arrangement 19 is a two-point TDM-FDM arrangement. As shown in FIG. 29, the components of the input signals $\{x_k(n)\}$ with k = 1, 2, 3, ... (N/2) are supplied to the sub-arrangement 17 and those of the input signals $\{x_k(n)\}$ with k = (N/2) + 1, (N/2) + 2, ..., N to the sub-arrangement 19. These sub-arrangements 17 and 18 produce the digital FDM-signals $\{y_1(n)\}$ and $\{y_2(n)\}$ respectively, these signals having associated therewith a sampling rate (N/2T) if M=N. These digital signals $\{y_1(n)\}$ and $\{y_2(n)\}$ are applied to the sub-arrangement 19 which produces the desired digital FDM-signal of the N input signals $\{x_k(n)\}$, k = 1, 2, ... N. The total number of multiplications to be performed in the three transformation devices in one period T now only amounts to 2.

$$(\frac{N}{2})^2 + \frac{N}{2} \cdot 2^2 = \frac{N^2}{2} + 2N.$$

In addition, the sampling rate of the digital signals which are applied to the digital filters in the sub-arrangements 8 and 9 is now equal to (N/2T), so that considerably less calculations per unit of time need be performed in these digital filters than in the digital filters which must be used in the TDM-FDM arrangement of FIG. 18 in the case M = N and $\omega_1 = 0$.

If N = $2\nu$, wherein $\nu$ represents an integer, each of the TDM-FDM arrangements 17 and 18 can in itself be constructed in a manner shown in FIG. 29.

It should be noted that the implementation of the TDM-FDM arrangement shown in FIG. 29 can also be utilized for converting complex signals into an FDM format. As already indicated in chapter E(1.4), a real signal $\{x_k(n)\}$ can be converted by means of the complex modulator shown in FIG. 17 into a complex signal, which is composed of two real signals Re $[P_k(n)]$ and Im $[P_k(n)]$ with, for example, the frequency spectrum shown in FIG. 18b and 18c respectively. To be able to convert the complex signals into, for example, the SSB-FDM signal shown in FIG. 20a, the signals Re $[P_k(n)]$ are applied to the sub-arrangement 17 shown in FIG. 29, and the signals Im $[P_k(n)]$ are applied to the sub-arrangement 18. The FDM-signals $\{y_1(n)\}$ and $\{y_2(n)\}$ thus obtained are now not applied to the two-point-TDM-FDM arrangement 19 but are added together.

E(2.7) The TDM-FDM arrangement using a fast transformation-device.

As indicated in chapter E(2.5.2) the FDM-condition for $\omega_1 \neq 0$ must be considered to be a special case of the FDM-condition for $\omega_1 = 0$. As in case $\omega_1 \neq 0$, the increase factor M of the SRI-elements must be greater than N; it will be assumed hereinafter that $\omega_1 = 0$ and M = N.

If in the TDM-FDM arrangement of FIG. 21, the number of input channels N is equal to $2\nu$, wherein $\nu$ represents an integer, and if the matrix A is chosen such that it results in a fast implementation, then not only the number of multiplications which must be performed in the transformation-device is drastically reduced in this TDM-FDM arrangement, but the digital filter 6(m), m = 1, 2, . . . N can be considerably simplified.

FIG. 30 shows a TDM-FDM arrangement for N = 8, wherein the matrix $A^{(8)}$ on which the transformation device 3 is based satisfies the above-mentioned property, and thus enables, for example, the fast implementation shown in FIG. 27 with two-point transformers. In this FIG. 30, elements which correspond with FIG. 21 and FIG. 27 have been given the same reference numerals. This TDM-FDM arrangement is provided with eight input channels 1(k) with k = 1, 2, 3, . . . N(=8). The input signals $\{x_q(n)\}$ with q = 1, 2, . . . N(=8) are applied to these input channels in an apparently arbitrary sequence. The sequence of these input signals is chosen such that an FDM-signal is obtained having exactly the same shape as the FDM-signal which is produced by the arrangement of FIG. 21 (cf. FIG. 20b). As in FIG. 21, the input channels to which the input signals with even number (q = even) are applied are each provided with a sideband interchanging modulator 2(p) with p = 1, 2, 3, 4. These input channels are connected to the inputs of a fast transformation device 3, which is constructed in the manner shown in FIG. 27, and which produces the complex output signals $\{s_m(n)\}$ with m = 1, 2, . . . N(=8). These output signals are applied to N signal channels. Each signal channel comprises means for increasing the sampling rate by a desired factor. Contrary to the signal channels of FIG. 21, the signal channels of FIG. 30 are partly used in common, so that each signal channel may be considered as having been built up from a plurality of sub-channels. In the Figure, the first channels are indicated by 21(.), the second sub-channels by 22(.), and the third sub-channels by 23(.). The signal channel which in FIG. 21 is indicated by 4(1) is now formed in the arrangement of FIG. 30 by the series-connected sub-channels 21(1), 22(1) and 23(1). Likewise, for example the signal channel which in FIG. 21 is indicated by 4(2), is now constituted by the series-connected sub-channels 21(2), 22(1) and 23(1).

The sub-channels 21(.) of FIG. 30 each comprise a series arrangement of an SRI-element 24(.) and a digital filter 25(.). The sub-channels 22(.) each comprise a series arrangement of an adder 26(.), an SRI-element 27(.), and a digital filter 28(.). The sub-channels 23(.) each comprise a series arrangement of an adder 29(.), an SRI-element 30(.), and a digital filter 31(.). In addition the sub-channels 23(.) are connected to inputs of an adder 32, which produces the desired digital FDM-signal $\{y(n)\}$. Because the transformation device consists of two-point transformers, the increase factor of all SRI-elements is equal to 2.

In FIG. 30, the transfer functions of the various digital filters are indicated by $H_{11}^{(1)}(\omega)$, $H_{11}^{(2)}(\omega)$, $H_{21}^{(1)}(\omega)$, $H_{21}^{(2)}(\omega)$, and so on. In general such a transfer function will be indicated by $H_{iz}^{(j)}(\omega)$ hereinafter wherein i = 1, 2, 3, . . . 7; j = 1, 2; and wherein z represents the number of the sub-channel z = 1, 2, 3.

Because the digital signals, which at least are applied to the digital filters 25(.) and 28(.), occur with a considerably lower sampling rate then the digital signals which are applied to the digital filters 6(.) of the arrangement of FIG. 21, the transfer functions of the first-mentioned filters can be realized in a considerably simpler manner.

In order to obtain the desired FDM-signal at the output of the adder 32 the transfer functions of the signal channels and the matrix $A^{(8)}$, whose fast implementation is shown in FIG. 30, must satisfy the FDM-condition (41).

The transfer function of a signal channel is now given by the product of the transfer function of the various digital filters which are found in the successive sub-channels, which together constitute the relevant signal channel. So, the transfer function of the first signal channel is, for example, equal to:

$$H_1(\omega) = H_{11}^{(1)}(\omega) \cdot H_{52}^{(1)}(\omega) \cdot H_{73}^{(1)}(\omega),$$

that of the second signal channel:

$$H_2(\omega) = H_{11}^{(2)}(\omega) \cdot H_{52}^{(1)}(\omega) \cdot H_{73}^{(1)}(\omega),$$

that of the third signal channel, $$H_3(\omega) = H_{21}^{(1)}(\omega) \cdot H_{52}^{(2)}(\omega) \cdot H_{73}^{(1)}(\omega).$$

The fundamental interval of these transfer functions $H_1(\omega), H_2(\omega), H_3(\omega) \ldots H_8(\omega)$ is equal to $8 \cdot (2\pi/T)$. If for these transfer functions, in accordance with expression (46), the matrix $H(\omega_o)$ is defined again, then the FDM-condition (48) must again be satisfied (M=8).

In the embodiment shown in FIG. 30, this FDM-condition is satisfied by having the transfer-functions $H_{iz}^{(1)}(\omega)$ and $H_{iz}^{(2)}(\omega)$, as well as the matrix $A_{iz}^{(2)}$, satisfy the FDM-condition. To be able to indicate this more concretely we define the filter sub-matrices:

$$H_{iz}(\omega_z) = \begin{pmatrix} H_{iz}^{(1)}(\omega_z) & H_{iz}^{(1)}(\omega_z + 2^{z-1} \cdot \frac{\pi}{T}) \\ H_{iz}^{(2)}(\omega_z) & H_{iz}^{(2)}(\omega_z + 2^{z-1} \cdot \frac{\pi}{T}) \end{pmatrix} \quad (72)$$

$$H_{iz}(2^{z+1} \cdot \frac{\pi}{T} - \omega_z) = \quad (73)$$

$$\begin{pmatrix} H_{iz}^{(1)}(2^{z+1} \cdot \frac{\pi}{T} - \omega_z) & H_{iz}^{(1)}\left[(2^{z+1} - 2^{z-1})\frac{\pi}{T} - \omega_z\right] \\ H_{iz}^{(2)}(2^{z+1} \cdot \frac{\pi}{T} - \omega_z) & H_{iz}^{(2)}\left[(2^{z+1} - 2^{z-1})\frac{\pi}{T} - \omega_z\right] \end{pmatrix}$$

wherein $i = 1, 2, 3, \ldots, 7$; $z = 1, 2, 3$.

$$0 \leq \omega_z < 2^{z-1} \cdot \frac{\pi}{T}$$

$$\frac{2^z}{T} = f_{sz}$$

Herein $f_{sz}$ represents the sampling rate associated with the input signal of the digital filter in the $z^{th}$ sub-channel, and which has the transfer function $H_{iz}^{(j)}(\omega)$. Again (1/T) represents the sampling rate associated with the signals $\{s_m(n)\}$. So it holds for the filters 25(.) that $z = 1$ and, consequently, $f_{sz} = f_{s1} = (2/T)$. It likewise holds for the filters 28(.) that $z = 2$, and for the filters 31(.) that $z = 3$.

By means of the filter sub-matrices (72) and (73), the FDM condition (48) now changes into:

$$A_{iz}^{(2)T} \cdot H_{iz}(\omega_z) + (A_{iz}^{(2)*})^T \cdot H_{iz}^*(2^{z+1} \cdot \frac{\pi}{T} - \omega_z) = 2T_2. \quad (74)$$

The sub-channels 21(.), 22(.) and 23(.) are now all implemented in the manner as indicated in FIG. 28. The index m, which is used in FIG. 28 for the denomination of the transfer functions, must now be replaced by a combination of indices i, z and j. This means that the digital filter $H_{iz}^{(j)}(\omega)$ is now built-up by means of the digital filters $H_{izp}^{(j)}(\omega)$ and $H_{izq}^{(j)}(\omega)$, which are given by (60). For the additional conditions specified in chapter E(2.5.2), the general implementation indicated in FIG. 28 of the sub-channel changes into that of FIG. 28a, or 28b or 28c.

It should be noted that in the embodiment shown in FIG. 30, the fast implementation of the transformation device was based on two-point transformers each having associated therewith a 2×2-matrix $A_{iz}^{(2)}$. If, however, this fast implementation was based on four-point transformers each having associated therewith a 4×4-matrix $A_{iz}^{(4)}$, then the above holds similarly.

E(2.8) Transformer matrices and transfer functions

From the above, it will be clear that a great number of transformer matrices are suitable in principle to serve as the base for the transformation device. However, not all transformer matrices which are suitable in principle will result in a realizable TDM-FDM arrangement because they will lead to an excessive number of multiplications in the transformation device or to very complicated digital filters.

In this chapter a number of matrices will be described by way of example, which may result in simple digital filters as well as in a simple transformation device, and which will allow a fast implementation of the transformation device.

A class of matrices which satisfies the above requirements is formed by the Hadamard matrices $\phi\nu$, where $\nu$ 1, 2, 3, . . . , which are defined as follows:

$$\phi_\nu = \begin{pmatrix} \phi_{\nu-1} & \phi_{\nu-1} \\ \phi_{\nu-1} & -\phi_{\nu-1} \end{pmatrix}, \quad (75)$$

wherein $\nu = 2, 3, \ldots$, and where $$\phi_1 = \begin{pmatrix} 1 & 1 \\ 1 & -1 \end{pmatrix}. \quad (76)$$

A Hadamard matrix is a real matrix which satisfies (68).

Because a Hadamard matrix allows a fast implementation, only the simplifications will be indicated here which are possible in the TDM-FDM arrangements shown in FIG. 30.

In the arrangement of FIG. 30, the number of input signals N is equal to $8 = 2^3$. This means that the transformation device 3 must be based on the 8×8 Hadamard matrix $\phi_3$. This results in that:

$$A_{iz}^{(2)} = \phi_1 \text{ for all i and all z.} \quad (77)$$

Now as an additional condition it can be chosen:

$$H_{iz}(\omega_z) = H_{iz}^*(2^{z+1} \cdot \frac{\pi}{T} - \omega_z),$$

so that $$H_{izq}(\omega_z) = 0.$$

From (67) it now follows that:

$$H_{izp}(\omega_z) = [\phi_1^T]^{-1} = \frac{1}{2}\begin{pmatrix} 1 & 1 \\ 1 & -1 \end{pmatrix} \text{ for all } i \text{ and all } z, \quad (78)$$

$$H_{izp}(2^{z+1} \frac{\pi}{T} - \omega_z) = \{[\phi_1^T]^{-1}\}^* =$$

$$\frac{1}{2}\begin{pmatrix} 1 & 1 \\ 1 & -1 \end{pmatrix} \text{ for all } i \text{ and all } z.$$

From (76) and from FIG. 23 it follows that the two-point transformers which together constitute the transformation device of FIG. 30 are very simple. Because the multiplication factors indicated in FIG. 23 are now given by:

$$\alpha_{11} = \alpha_{12} = \alpha_{21} = 1$$

$$\alpha_{22} = -1$$

$$\beta_{11} = \beta_{12} = \beta_{21} = \beta_{22} = 0,$$

the multipliers 9(1), 10(1) and 9(3) of FIG. 23 can be replaced by through-connections.

Before the influence of the Hadamard matrix on the transfer functions of the digital filter is described, it is be noted that the TDM-FDM arrangement shown in FIG. 30 comprises seven circuit configurations of the type depicted in FIG. 31. This circuit configuration comprises two channels I and II. To each of these channels a digital signal having associated therewith a sampling period $T/(2^z - 1)$ is applied, and this configuration produces a digital output signal having associated therewith a sampling period $T/2^z$. For the sub-channels 21(.) in FIG. 30 $z = 1$, for the sub-channels 22(.) $z = 2$, and for the sub-channels 23(.) $z = 3$.

Figure 32:
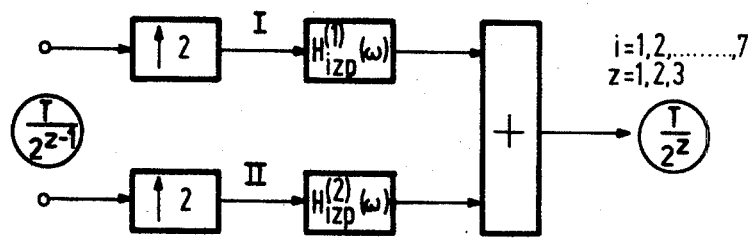

By choosing the Hadamard matrix as the transformer matrix, it is now obtained that:

$$H_{iz}(\omega_z) = H_{izp}(\omega_z),$$

so that the circuit configuration shown in FIG. 31 changes into the circuit configuration depicted in FIG. 32 (see also FIG. 28c).

Figure 33:
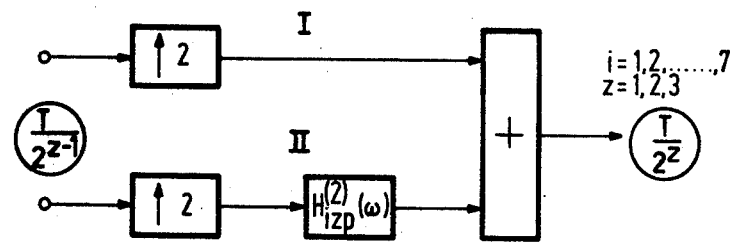

From (78) it follows that:

$$H_{izp}^{(1)}(\omega_z) = H_{izp}^{(1)}(\omega_z + 2^{z-1}\frac{\pi}{T}) = 1$$

$$H_{izp}^{(1)}(2^{z+1}\frac{\pi}{T} - \omega_z) =$$

$$H_{izp}^{(1)}[(2^{z+1} - 2^{z-1})\frac{\pi}{T} - \omega_z] = 1,$$

so that the digital filters having the transfer functions $H_{izp}^{(1)}(\omega)$ are each equivalent to a through-connection. For completeness this situation is depicted in FIG. 33. Consequently the TDM-FDM arrangement comprises only $N-1=7$ digital filters.

From (78) it furthermore follows that for the digital filters having the transfer functions $H_{izp}^{(2)}(\omega)$, it holds that:

$$H_{izp}^{(1)}(\omega_z) = H_{izp}^{(2)}(2^{z+1}\frac{\pi}{T} - \omega_z) = 1$$

$$H_{izp}^{(2)}(\omega_z + 2^{z-1}\frac{\pi}{T}) =$$

$$H_{izp}^{(2)}[(2^{z+1} - 2^{z-1})\frac{\pi}{T} - \omega_z] = -1.$$

Figure 34:
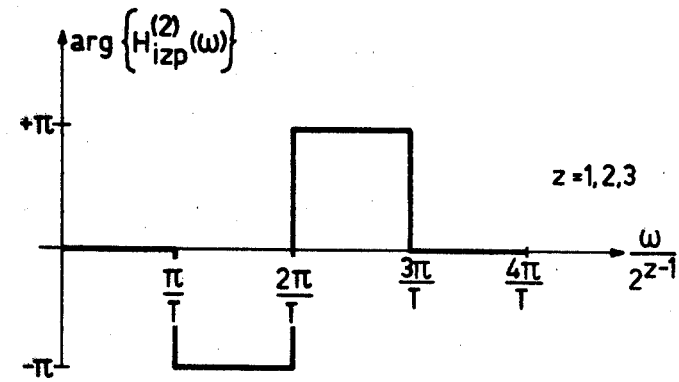

This means that these digital filters are formed by all-pass filter, which introduce a phase shift of 0, $-\pi$ or $+\pi$. FIG. 34 shows, for completeness, the argument of $H_{izp}^{(2)}(\omega)$ as a function of $\omega$.

Figure 35:
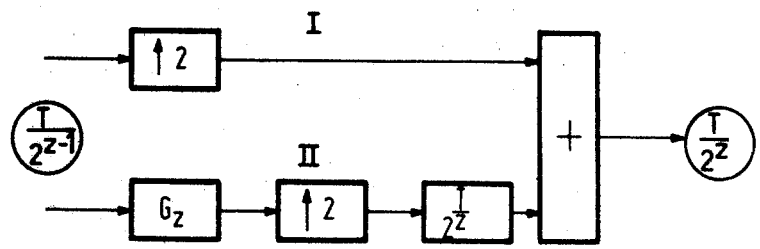
Figure 36:
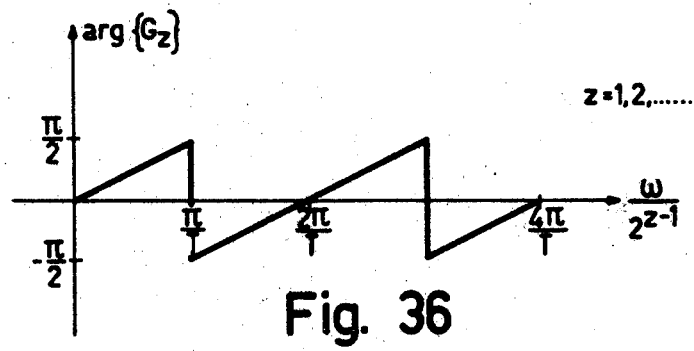
Figure 37:
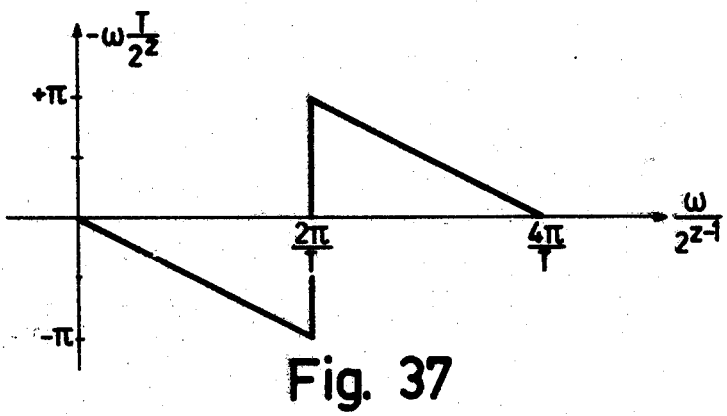

A further simplification of the circuit configuration of FIG. 33 is depicted in FIG. 35. This configuration differs from that of FIG. 33 is that the channel II is now constituted by a series arrangement of a digital filter having a transfer function $G_z$, the SRI-element having an increase factor 2, and a delay device having a delay time $T/2^z$. The amplitude-frequency characteristic of both the digital filter and the delay device is equal to unity. FIG. 36 shows two fundamental intervals of the phase-frequency characteristic of the digital filter. For completeness FIG. 37 shows the phase-frequency characteristic of the delay device over one fundamental interval. The phase-frequency characteristic shown in FIG. 34 is now obtained by adding the characteristic shown in the FIGS. 36 and 37 together.

Figure 38:
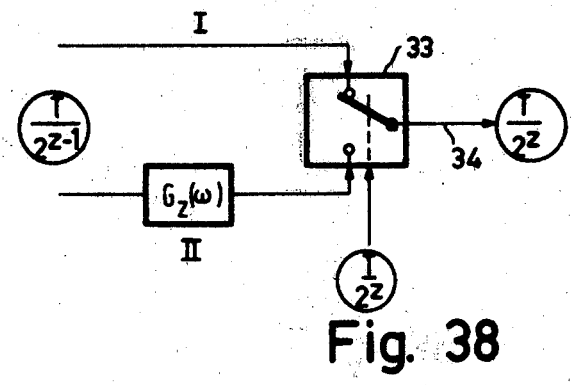

In a practical embodiment, the circuit configuration of FIG. 35 can be reduced to the configuration depicted in FIG. 38, which is equivalent to the configuration depicted in FIG. 35, and which is also provided with two channels I and II. The functions of the SRI-elements, the delay device, and the adder shown in FIG. 35, however, are now concentrated in a switching device 33. This switching device, which is only symbolically shown, is controlled by switching pulses which are produced with a period $T/2^z$. At the occurrence of the first of two successive switching pulses, the channel I is connected to the output 34 of this switching device, and when the second switching pulse occurs the channel II is connected to this output 34. At the output 34 of the circuit configuration a digital signal is produced having associated therewith a sampling period $T/2^z$, and which is formed by a succession of signal components, which alternatingly originate from the channel I and the channel II (interleaving).

For completeness, FIG. 39 shows the complete implementation of the TDM-FDM arrangement, wherein the Hadamard matrix $A_{iz}^{(2)} = \phi_1$, defined in (76), is the basis of each of the transformers. This TDM-FDM arrangement follows, together with the preceding description, from the FIGS. 30, 23, 27 and 38. The digital filters having the transfer functions $G_1$, $G_2$, $G_3$ are all all-pass filters having the phase-frequency characteristics shown in FIG. 36.

A further real matrix which results in both simple digital filters and a simple transformation device, and which allows a fast implementation of this transformation device, is obtained if $$A_{iz}^{(2)} = \begin{pmatrix} 1 & 0 \\ -1 & 1 \end{pmatrix} \text{ for all } i \text{ and all } z. \tag{79}$$

If, it is again assumed that $H_{izq}(\omega_z) = 0$ it then follows together with (74) that:

$$H_{iz}(\omega_z) = H_{izp}(\omega_z) = \begin{pmatrix} 1 & 1 \\ 0 & 1 \end{pmatrix} \text{for all } i \text{ and all } z \tag{80}$$

$$H_{iz}(2^{z+1}\frac{\pi}{T} - \omega_z) = H_{izp}(2^{z+1}\cdot\frac{\pi}{T} - \omega_z) = \begin{pmatrix} 1 & 1 \\ 0 & 1 \end{pmatrix},$$

Also, with this choice of the transformer matrix $A_{iz}^{(2)}$, the circuit configuration of FIG. 33 applies, so that the TDM-FDM arrangement of FIG. 30 can again be realized with only $N-1$ digital filters.

Figure 40:
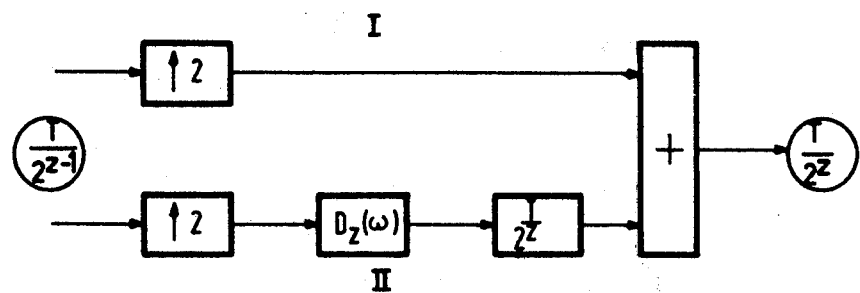
Figure 41:
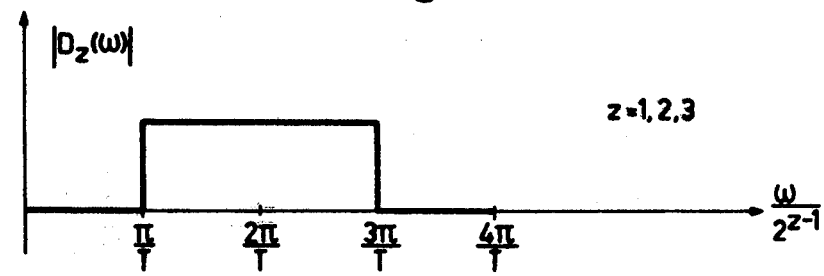
Figure 42:
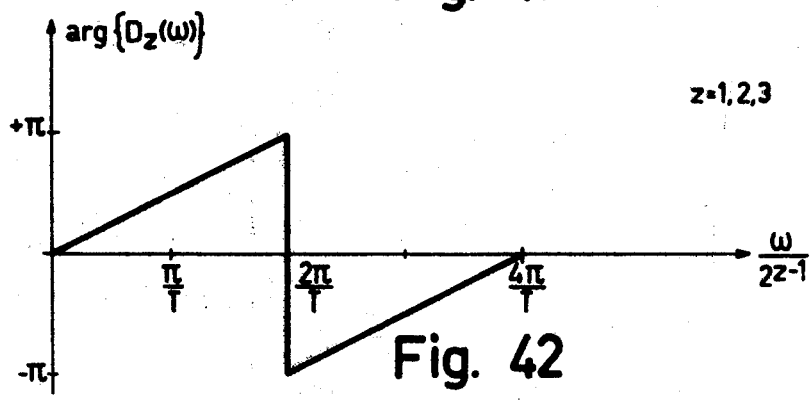

The digital filter shown in FIG. 33 with transfer function $H_{izp}^{(2)}(\omega)$ can now again be realized by a cascade arrangement of a digital filter with transfer function $D_z(\omega)$ and a delay device having a delay time $T/2^z$ (see FIG. 40). The amplitude-frequency characteristic of $D_z(\omega)$ is shown in FIG. 41, and its phase-frequency characteristic is shown in FIG. 42.

When the transformer matrix is chosen according to (79), and when a phase distortion may be allowed, the circuit configuration of FIG. 33 can also be implemented in a manner different from the implementation which is depicted in FIG. 40. Taking into account the remarks indicated in chapter E(2.3), the FDM-condition (74) can now be written in the form:

$$A_{iz}^{(2)T} H_{izp}(\omega_z) = 2I_2 \text{ diag } [\psi_{iz}(\omega_z)]$$

so that:

$$H_{izp}(\omega_z) = \begin{pmatrix} 1 & 1 \\ 0 & 1 \end{pmatrix} \begin{pmatrix} \psi_{iz;1}(\omega_z) & 0 \\ 0 & \psi_{iz;2}(\omega_z) \end{pmatrix} =$$

$$\begin{pmatrix} \psi_{iz;1}(\omega_z) & \psi_{iz;2}(\omega_z) \\ 0 & \psi_{iz;2}(\omega_z) \end{pmatrix}$$

Because $H_{izp}^{(2)}(\omega_z) = 0$, a phase-frequency function may be allotted to $H_{izp}^{(2)}(\omega_z)$, which is equal to $\psi_{iz,1}(\omega_z)$. If it is now assumed:

$$H_{izp}^{(2)}(\omega) = |D_z(\omega)| \, \psi_{iz,2}(\omega),$$

whereby the function $|D_z(\omega)|$ is depicted in FIG. 41, then we are still free to choose $\psi_{iz,1}(\omega_z)$ equal to $\psi_{iz,2}(\omega_z)$. This means that in FIG. 33 a digital filter having the amplitude-frequency function shown in FIG. 41, and a phase-frequency function which is given by $\psi_{iz,2}(\omega)$, must be included in channel II, and that a digital all-pass filter having the same phase-frequency function $\psi_{iz,2}(\omega)$ must be included in the channel I.

In chapter E(2.4) it was noted that a fast transformation device can also be implemented by means of, for example, four-point transformers. Such an implementation can, for example, be advantageous if $N=2^\nu$, wherein $\nu$ represents a positive integer. With such an implementation, the increase factor of SRI-elements in the various sub-channels of the device of FIG. 30 is equal to four, and the transfer matrix is defined for four sub-channels of the same number. For completeness, a real transformer matrix will now be given, which might be the basis for the four-point transformers. Such a matrix, for example, is the real matrix $$A_{iz}^{(4)} = \begin{pmatrix} 1 & -1 & 0 & 0 \\ 0 & 1 & -1 & 0 \\ 0 & 0 & 1 & -1 \\ 0 & 0 & 0 & 1 \end{pmatrix} \text{ for all } i \text{ and all } z.$$

If now again the additional condition is given by:

$$H_{iz}(\omega_z) = 0,$$

then it follows from (69) that:

$$H_{izp}(\omega_z) = (A_{iz}^{(4)T})^{-1},$$

so that:

$$H_{izp}(\omega_z) = \begin{pmatrix} 1 & 0 & 0 & 0 \\ 1 & 1 & 0 & 0 \\ 1 & 1 & 1 & 0 \\ 1 & 1 & 1 & 1 \end{pmatrix}.$$

In chapter E(2.7), it is indicated that the TDM-FDM-arrangement depicted in FIG. 21 can be replaced by the TDM-FDM-arrangement depicted in FIG. 30, when the transformer matrix allows a fast implementation. In case $\omega_1 = 0$ and the transformation device is based upon a real Hadamard matrix, the arrangement of FIG. 30 can be still further modified to the arrangement shown in FIG. 39.

If $\omega_1 \neq 0$, the signals $\{r_k(n)\}$ applied to the transformation device in the arrangement of FIG. 30 are complex. This means that the increase factor of the SRI-elements in the various sub-channels must at least be equal to three. From FIG. 30 it will be clear that this means that if, with the arrangement of FIG. 30, eight signals $\{x_k(n)\}$, which are all unequal to zero must be converted into, a FDM-signal a sampling rate must be associated with the output signal $\{y(n)\}$ which is at least equal to 27/T. If this is compared with the sampling rate which is associated with the signal $\{y(n)\}$ which is produced by the arrangement of FIG. 21, and which is at least equal to 9/T, then it appears that the implementation shown in FIG. 30 is not attractive if $\omega_1 \neq 0$.

If for special circumstances, for example, if the signals $\{r_k(n)\}$ represent complex signals, in the arrangement shown in FIG. 30, a complex transformer-matrix is preferred over a real transformer-matrix, then it would, for example, be possible to take therefore the matrix:

$$A_{iz}^{(2)} = \frac{1}{2}\begin{pmatrix} 1+j & 1-j \\ 1-j & -1+j \end{pmatrix} \text{ for all } i \text{ and all } z.$$

To indicate the influence of this choice of the transformer-matrix on the digital filters, we shall again restrict ourselves to the case $\omega_1 = 0$. If the additional condition:

$$H_{iz}(2^{z+1}\frac{\pi}{T} - \omega_z) = 0$$

is now chosen, then the sub-channels must be constructed in the manner shown in FIG. 28a. From (65) it now follows that:

$$H_{izp}(\omega_z) = \frac{1}{2}\begin{pmatrix} 1 & 1 \\ 1 & -j \end{pmatrix} \text{ for all } i \text{ and all } z$$

$$H_{izp}(2^{z+1}\frac{\pi}{T} - \omega_z) = \frac{1}{2}\begin{pmatrix} 1 & 1 \\ 1 & j \end{pmatrix}.$$

As regards the transformation device the above means that:

| | |
|---|---|
| $\alpha_{11} = 1$ | $\alpha_{12} = 1$ |
| $\beta_{11} = 1$ | $\beta_{12} = -1$ |
| $\alpha_{21} = 1$ | $\alpha_{22} = -1$ |
| $\beta_{21} = -1$ | $\beta_{22} = 1.$ |

Figure 43:
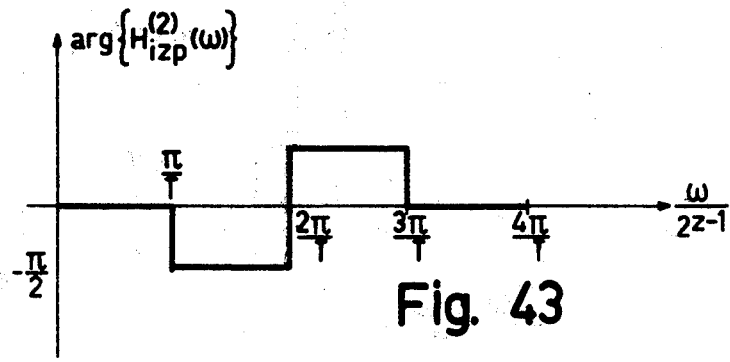

So it applies for the digital filters $H_{izp}^{(i)}(\omega)$, that the filters having the transfer function $H_{izp}^{(1)}(\omega)$, just form through-connections, and that the digital filter having the transfer function $H_{izp}^{(2)}(\omega)$ forms an all-pass filter which introduces a $-\pi/2$ phase shift in the interval $2^{z-1}\pi/T \leq \omega < 2^z\pi/T$, and which introduces a $+\pi/2$ phase shift in the interval $2^z\pi/T \leq \omega < 2^{z-1}3\pi/T$. For completeness, FIG. 43 shows the argument of $H_{izp}^{(2)}(\omega)$ as a function of $\omega$.

As has already been remarked, if $N = 4^\nu$, wherein $\nu$ represents a positive integer, the transformation device can also be based upon four-point transformers.

A possible $4 \times 4$-matrix is the complex matrix $$A_{iz}^{(4)} = \begin{pmatrix} 1 & 1 & 1 & 1 \\ 1 & j & -1 & -j \\ 1 & -1 & 1 & -1 \\ 1 & -j & -1 & j \end{pmatrix} \text{ with } j = \sqrt{-1} \quad (81)$$

With the additional condition:

$$H_{iz}(2^{z+1}\frac{\pi}{2} - \omega_z) = 0,$$

it follows from (65) that:

$$H_{izp}(\omega_z) = \begin{pmatrix} 1 & 1 & 1 & 1 \\ 1 & -j & -1 & j \\ 1 & -1 & 1 & -1 \\ 1 & j & -1 & -j \end{pmatrix} \text{ with } j = \sqrt{-1} \quad (82)$$

for all i and all z. In full agreement with the above, the transfer functions in the various intervals follow from these transfermatrices.

For completeness, FIG. 44 shows an elaborated embodiment of the arrangement of FIG. 21, wherein the real signals $\{x_k(n)\}$ are converted into complex signals by means of the complex modulators. In the arrangement of FIG. 44, N = 4, M = 5, and the transformation device is based upon the matrix $A_{iz}^{(4)}$ given in (81). For the transfer functions of the digital filters, it is again assumed that $H_m^* (5 \cdot 2\pi/T - \omega_o) = 0$, so that the signal channels must be implemented in the manner shown in FIG. 28a. The transfer functions $H_{mp}(\omega)$ of the digital filters incorporated in these signal channels are given by (82). The amplitude-frequency function is the same for all digital filters $H_{mp}(\omega)$ with m = 1,2,3,4, and is shown in FIG. 45. The phase-frequency functions of the various digital filters $H_{mp}(\omega)$ are depicted in FIG. 46.

As can be esily checked, taking into account the expressions (16), the TDM-FDM arrangement shown in FIG. 44 produces the FDM-signal shown in FIG. 20a.

It should be noted that in the arrangement of FIG. 44, only the real part of the complex signals $\{u_m(n)\}$ is determined. For, the imaginary part of this signal has no contribution to the desired FDM-signal.

E(2.9) General remark about the TDM-FDM arrangement

1. Each of the FIGS. 21, 28, 28a, 28b, 28c, 30,31,32,33,40 and 44 show series arrangements of an SRI element and a digital filter. In a practical embodiment of such a series arrangement, the function of the SRI-element and that of the digital filter are interwoven, so that a practical embodiment of such a series arrangement is constituted by an interpolating digital filter, which is also called a sampling rate increasing digital filter. For the implementation of such a digital filter we refer, for example, to references 15, 16 and 17.

2. The elements 8 shown in the FIGS. 21 and 30 are used for mathematical purposes only. As appears from the FIGS. 39 and 44, such an element is not used in a practical embodiment of the TDM-FDM convertor because the real and the imaginary part of a complex signal are available separately. To determine the signal Re [v(n)], it is sufficient to apply the signals Re [$u_m(n)$] to the adder 7 and 32 respectively.

3. In the preceding it was assumed that, if $\omega_1 = 0$, the channel signals in the frequency spectrum of the FDM-signal are located as shown in FIG. 20b. This means that for N = 4, the FDM-signal of the four baseband signals $\{x_1(n)\}, \{x_2(n)\}, \{x_3(n)\}$ and $\{x_4(n)\}$ is located in the frequency band of $0 \leq \omega < 8\pi/T$. However, if it is desired to have the FDM-signal situated, for example, in the frequency band $\pi/T \leq \omega < 9\pi/T$, then, of course, $\omega_1$ may be taken equal to $\pi/T$. It is, however, simpler to choose N equal to 5 and to compose a FDM-signal starting from the five baseband signals $\{x_o(n)\}, \{x_1(n)\}, \{x_2(n)\}, \{x_3(n)\}$ and $\{x_4(n)\}$, whereby $\{x_o(n)\}$ is equal to zero for all n.

4. If $\omega_1 \neq 0$, as in the TDM-FDM arrangement of FIG. 44, the transfer functions $H_m(\omega)$ must be equal to zero in those frequency intervals which are not covered by the FDM-condition.

F(1) The FDM-TDM arrangement

Chapter E extensively describes arrangements for converting a plurality of discrete baseband signals into a discrete baseband single-sideband frequency-multiplex signal. This chapter briefly deals with arrangements formed by the transposed configurations of the arrangements described in chapter E, and which thus convert a discrete baseband single-sideband frequency division-multiplex signal into the original, spatially distributed, discrete baseband signals. The transposed configuration of a given arrangement is obtained by
 reversing the direction of all signals;
 replacing the adders by branch nodes;
 replacing the branch nodes by adders;
 replacing the SRI-elements by SRR-elements;
 replacing the SRR-elements by SRI-elements.

The transposed configuration of the TDM-FDM arrangement shown in FIG. 21 is depicted in FIG. 47. This FDM-TDM arrangement comprises a plurality of N signals channels 4'(m) with m = 1,2,3 ... N. Applied to each of these signal channels is the FDM-signal $\{y(n)\}$ having the frequency spectrum $Y(\omega)$, which, for example, again has the form which for N=4 is depicted in FIG. 20a is applied to each signal channel. Each signal channel 4'(m) comprises a digital filter 6'(m) having the transfer-function $E_m(\omega)$ and an impulse response $e_m(n)$, which, in general is complex $e_m(n) = Re [e_m(n)] + j Im [e_m(n)]$. This digital filter 6'(m) produces a digital output signal $t'_m(n)$ which is given by:

$$t'_m(n) = Re [t'_m(n)] + j Im [t'_m(n)].$$

If $\{y(n)\}$ represents a real signal it follows that (see 52))

$$Re [t'_m(n)] = y(n) * Re [e_m(n)]$$

$$Im [t'_m(n)] = y(n) * Im [e_m(n)].$$

The frequency spectrum $T'_m(\omega)$ of $\{t'_m(n)\}$ is given by:

$$T'_m(\omega) = Y(\omega) \cdot E_m(\omega).$$

This signal $\{t'_m(n)\}$ is applied to an SRR-element 5'(m). From (11) it follows that the components $s'_m(n)$ of the output signal $\{s'_m(n)\}$ of the SRR-element are equal to:

$$s_m'(n) = t_m'(Mn).$$

From (12) it follows that the frequency spectrum $S'_m(\omega)$ is given by:

$$S_m'(\omega) = \frac{1}{M} \sum_{q=1}^{M} T_m' \left[ \omega + (q-1)\frac{2\pi}{T} \right],$$

wherein T represents the sampling period associated with the signal $\{s'_m(n)\}$.

The signals $\{s'_m(n)\}$ thus obtained are applied to the transformation device 3', which comprises N output channels 1(k), and whose operation can again be fully described by means of a matrix $B = [b_{km}]$ comprising the elements $b_{km}$. This transformation device produces N digital signals $\{r'_k(n)\}$, k = 1, 2, 3, ... N, which are given by:

$$r'_k(n) = \sum_{m=1}^{N} b_{km} s'_m(n).$$

The associated frequency spectrum $R'_k(\omega)$ is given by:

$$R'_k(\omega) = \sum_{m=1}^{N} b_{km} S'_m(\omega).$$

The complex signal $\{r'_k(n)\}$ is applied to a complex demodulator $1'(1,k)$, which produces the complex signal $\{w_k(n)\}$ which is given by $w_k(n) = r'_k(n)e^{-j\omega_1 nT}$. Of this signal, the arrangement $8(k)$ now produces the real part of the signals $\{w_k(n)\}$. Thus the output signal $v_k(n)$ of this arrangement $8(k)$ is given by $$v_k(n) = Re[w_k(n)] = \tfrac{1}{2}[w_k(n) + w_k^*(n)]$$

Herein $w_k^*(n)$ again represents the complex conjugate of $w_k(n)$. For the frequency spectrum $V_k(\omega)$ of $\{v_k(n)\}$, it again holds (see (30))

$$V_k(\omega) = \tfrac{1}{2} \cdot \left\{ R'_k(\omega + \omega_1) + R'^*_k\left[\frac{2\pi}{T} - \omega + \omega_1\right] \right\}.$$

For the output channels $1(k)$, with odd number k it again holds that $x_k(n) = v_k(n)$, and each of the output channels with even number k again comprises a sideband interchanging modulator $2'(.)$, whose output signals constitute the desired signals $\{x_k(n)\}$ for k is even.

After some manipulation in the manner indicated in chapter E(2.3), it is possible to derive the TDM-conditions from the above expressions. The TDM-condition for $\omega_1 = 0$ as follows:

$$\frac{1}{2N} \cdot \sum_{m=1}^{N} \left\{ b_{km} E_m\left[\omega_o + (i-1)\frac{\pi}{T}\right] + b_{km}^* E_m^*\left[M\frac{2\pi}{T} - \omega_o + (i-1)\frac{\pi}{T}\right]\right\} = \delta_{ki}.$$  (83)

The TDM condition for $\omega_1 \neq 0$ is as follows:

$$E_m^*\left[M\frac{2\pi}{T} - \omega_o + \omega_1 + (i-1)\frac{\pi}{T}\right] = 0$$  (84)

$$\frac{1}{2N} \sum_{m=1}^{N} b_{km} E_m\left[\omega_o + \omega_1 + (i-1)\frac{\pi}{T}\right] = \delta_{ki}.$$

In (83) and (84) $\delta_{ki}$ again represents the Kronecker symbol, which is defined in (43). Furthermore it applies that:

$$0 \leq \omega_o < \frac{\pi}{T}$$
$$i = 1, 2, 3, \ldots N.$$

Just as the FDM-conditions (41) and (42), the TDM conditions (83) and (84) can be written in the form of a matrix, the matrices defined in (46) and (47) being applicable, so that (83) changes into:

$$B^{(N)} \cdot \underline{E}(\omega_o) + B^{(N)*}\underline{E}^*(M \cdot \frac{2\pi}{T} - \omega_o) = 2NI_N \cdot \text{diag}\ [\psi_i(\omega_o)],$$  (85)

and (84) changes into:

$$E^*(M\frac{2\pi}{T} - \omega_o) = 0$$  (86)
$$B^{(N)} \cdot \underline{E}(\omega_o) = 2NI_N \cdot \text{diag}\ [\psi_i(\omega_o)].$$

FIG. 47 shows a possible implementation of a FDM-TDM arrangement wherein the relationship between the transfer functions $E_m(\omega)$ of the digital filters $6'(m)$, with $m = 1, 2, 3, \ldots N$, and the transformation matrix on which the transformation device $3'$ is based, is given by the TDM-condition (84) or (86). As for the TDM-FDM arrangement, a complete freedom in the choice of the various matrices is possible, so that what has been described for the TDM-FDM arrangement fully applies for this FDM-TDM arrangement.

Comparing the TDM-conditions with the FDM-conditions shows that these conditions are not identical. In the case the FDM-TDM arrangement is obtained by transposing the TDM-FDM arrangement, this is, however, only seemingly so. By transposing the digital filters $6(m)$ of FIG. 21, these filters change into the digital filters $6'(m)$ of FIG. 47. It is true that this causes the implementation of the digital filter $6'(m)$ to be different from that of the filter $6(m)$, but the transfer function of the filter $6(m)$ is not affected hereby (see reference 2) so that:

$$E_m(\omega) = H_m(\omega).$$  (87)

It can be checked in a simple manner that by transposing the transformation device 3, which is based on a matrix $A^{(N)} = [a_{mk}]$, the transformation device $3'$ is obtained, which is based on a matrix $A^{(N)T} = [a_{km}]$, so that $$B^{(N)} = A^{(N)T}.$$  (88)

Substitution of (87) and (88) in (86) again furnishes the FDM-condition (49), and substitution of (87) and (88) in (85) furnishes the FDM-condition (48). From the preceding it consequently follows that a FDM-TDM arrangement can be obtained by transposing a given TDM-FDM arrangement or vice versa.

F(2) General remarks about the FDM-TDM arrangement

1. FIG. 47 and the arrangements which are obtained by transposing the TDM-FDM arrangements shown in the FIGS. 30 and 39 each comprise series arrangements of a SRR-element and a digital filter. In a practical implementation of such a series arrangement, the function of the SRR-element and the function of the digital filter are interwoven. Such a series arrangement is consequently implemented by means of an extrapolating digital filter, also called sampling rate reducing digital filter. For the implementation of such a digital filter we refer to the references 15 and 18.

2. The complex demodulator shown in FIG. 47 can, as the further elements of this arrangement, be obtained by reversing, in FIG. 17, the signal direction and by replacing the distribution point by a subtractor. With such an implementation of the complex demodulator, the output signal hereof is given by $Re[w_k(n)]$, so that the arrangement 8(k) can be dispensed with in a practical embodiment of the FDM-TDM arrangement.

3. The TDM-FDM arrangement and the FDM-TDM arrangement need not form a system in which, for example, the TDM-FDM arrangement functions as a transmitter and the FDM-TDM arrangement as a receiver or vice versa. Each of these arrangements can be used in existing PCM telecommunication systems independent of the application of the other arrangement.

What is claimed is:

1. An arrangement for converting N discrete baseband signals $\{x_k(n)\}$, ($k = 1, 2, 3, \ldots N$) having associated therewith a sampling rate $1/T$ and a frequency spectrum $X_k(\omega)$, into a discrete baseband single-sideband frequency division-multiplex signal $\{y(n)\}$, ($n = \ldots -2, -1, 0, +1, +2, \ldots$) having associated therewith a sampling rate $1/T$ which is at least equal to $N/T$ and having associated therewith a frequency spectrum $Y(\omega)$, wherein $$Y\left[\omega_o + (k-1)\frac{\pi}{T}\right] = X_k(\omega_o) \cdot \psi_k(\omega_o)$$

wherein the arrangement comprises:
means for receiving said baseband signals $\{x_k(n)\}$;
means for selectively modulating the received signals $\{x_k(n)\}$ for generating baseband signals $\{r_k(n)\}$;
a transformation device means for processing said baseband signals $\{r_k(n)\}$ for generating a plurality of discrete conversion signals $\{s_m(n)\}$, ($m = 1, 2, 3, \ldots N$), said transformation device having associated therewith a transformer matrix A comprising the elements $a_{mk}$ of a constant value, and which transformer matrix is unequal to the discrete Fourier transformer matrix, and wherein the relation between the components $s_m(n)$ and the components $r_k(n)$ is given by $$s_m(n) = \sum_{k=1}^{N} a_{mk} r_k(n);$$

a plurality of signal channels to each of which one of the conversion signals is applied, and which each include discrete filtering means and sampling rate increasing means for generating discrete signals $\{u_m(n)\}$, the transfer function of the signal channel which is determined by said discrete filtering means being equal to $H_m(\omega)$;
means for forming a discrete sum signal $$\sum_{m=1}^{N} u_m(n), \text{ wherein}$$

$$y(n) = \sum_{m=1}^{N} u_m(n);$$

wherein for each signal channel the relationship between its transfer function $H_m(\omega)$ and the matrix elements $a_{mk}$ is given by FDM-condition $$\frac{1}{2} \sum_{m=1}^{N} \left\{ a_{mk} H_m \left[\omega_o + (i-1)\frac{\pi}{T}\right] + \right.$$

-continued $$\left. a_{mk}^* H_m^* \left[\frac{2\pi}{T_y} - \left(\omega_o + (i-1)\frac{\pi}{T}\right)\right]\right\} = \delta_{ki}\psi_i(\omega_o)$$

wherein:
m represents the number of the relevant signal channel;
$\omega_o$ represents a frequency in the range $0 \leq \omega_o < \pi/T$;
$a_{mk}^*$ represents the complex conjugate of $a_{mk}$;
$H_m^*(\omega)$ represents the complex conjugate of $H_m(\omega)$;
$i = 1, 2, 3, \ldots N$;
$\delta_{ki} = 0$ for $k \neq i$
$\delta_{ki} = 1$ for $k = i$;
$\psi_i(\omega_o)$ represents an arbitrary function of $\omega_o$.

2. An arrangement for converting N discrete baseband signals $\{x_k(n)\}$, ($k = 1, 2, 3, \ldots N$) having associated therewith a sampling rate $1/T$ and a frequency spectrum $X_k(\omega)$, into a discrete baseband signal-sideband frequency division-multiplex signal $\{y(n)\}$, ($n = \ldots -2, -1, 0, +1, +2, \ldots$) having associated therewith a sampling rate $1/T$ which is at least equal to $M/T$, wherein M represents an integer which is greater than N and having associated a frequency spectrum $Y(\omega)$, wherein $$Y[\omega_1 + \omega_o + (k-1)\frac{\pi}{T}] = X_k(\omega_o)\psi_k(\omega_o),$$

wherein the arrangement comprises:
means for receiving said signals $\{x_k(n)\}$;
a cascade arrangement of selective modulation means and complex modulation means, said cascade arrangement having an input coupled to said receiving means and being arranged for generating complex signals $\{r_k(n)\}$, a complex carrier signal, having a frequency $\omega_1/2\pi$, being associated with said complex modulation means, whereby $$\omega_1 \neq \delta\frac{\pi}{T} \text{ with } \delta = 0, \pm 1, \pm 2, \ldots;$$

a transformation device means for processing said signals $\{r_k(n)\}$ and for generating a plurality of discrete conversion signals $\{s_m(n)\}$, ($m = 1, 2, 3, \ldots N$), with which transformation device having associated therewith a transformer matrix A comprising the elements $a_{mk}$ of a constant value and which transformer matrix is unequal to the discrete Fourier transformer matrix, and wherein the relation between the components $s_m(n)$ and the components $r_k(n)$ is given by $$s_m(n) = \sum_{k=1}^{N} a_{mk} r_k(n);$$

a plurality of signal channels to each of which one of the conversion signals is applied, and which each include discrete filtering means and sampling rate increasing means for generating discrete signals $\{u_m(n)\}$, the transfer function of the signal channel which is determined by said discrete filtering means being equal to $H_m(\omega)$;

means for forming a discrete sum signal $$\left\{\sum_{m=1}^{N} u_m(n)\right\} \text{ wherein } y(n) = \sum_{m=1}^{N} u_m(n);$$

wherein for each signal channel the relationship between its transfer function $H_m(\omega)$ and the matrix elements $a_{mk}$ is given by the FDM-condition $$H_m^*[\frac{2\pi}{T_y} - \omega_o + \omega_1 + (i-1)\frac{\pi}{T}] = 0$$

$$\frac{1}{2}\sum_{m=1}^{N} a_{mk} H_m [\omega_o + \omega_1 + (i-1)\frac{\pi}{T}] = \delta_{ki}\psi_i(\omega_o),$$

wherein:
  m represents the number of the relevant signal channel;
  $\omega_o$ represents the frequency in the range $0 \leq \omega_o < \pi/T$;
  $H_m^*(\omega)$ represents the complex conjugate of $H_m(\omega)$;
  i = 1,2,3, ... N;
  $\delta_{ki} = 0$ for $k \neq i$
  $\delta_{ki} = 1$ for $k = i$;
  $\psi_i(\omega_o)$ represents an arbitrary function of $\omega_o$.

3. An arrangement as claimed in claim 1, wherein said matrix elements $a_{mk}$ are each equal to $\alpha_{mk} + j\beta_{mk}$, wherein $\alpha_{mk}$ and $\beta_{mk}$ are constants each having a value belonging to the set of values 0, +1, −1, wherein $j = \sqrt{-1}$.

4. An arrangement as claimed in claim 1, wherein each signal channel comprises a series arrangement of a plurality of sub-channels each comprising discrete filtering means and sampling rate increasing means, and wherein in the $z^{th}$ sub-channel a discrete signal hving associated therewith a sampling rate $1/T_z$ is applied to the discrete filtering means.

5. An arrangement as claimed in claim 4, wherein said transformation device comprises a fast transformation device comprising a plurality of transformers each having associated therewith a p×p sub-matrix $A_{\gamma z}^{(p)} = [a_{\gamma z,\alpha\beta}]$ of a set of p×p matrices ($\gamma = 1, 2, 3, ...$; $z = 1, 2, 3, ...$; $\alpha, \beta = 1, 2, 3 ... p$) and a group of p sub-channels of equal number z and belonging to different signal channels, the discrete filtering means of the sub-channels of number z having the respective transfer functions $H_{\gamma z}^{(j)}(\omega)$ with $j = 1, 2, 3, ... p$, wherein the relationship between the elements $a_{\gamma z,\alpha\beta}$ and such a transfer function $H_{\gamma z}^{(j)}(\omega)$ being given by the FDM-condition $$\frac{1}{2}\sum_{\alpha=1}^{p}\left\{a_{\gamma z,\alpha\beta} \cdot H_{\gamma z}^{(\alpha)}[\omega_z + (i-1)p^{z-1}\frac{\pi}{T}] + \right.$$

$$\left. a_{\gamma z,\alpha\beta}^* \cdot H_{\gamma z}^{(\alpha)*}[p^{z+1}\frac{\pi}{T} - \{\omega_z + (i-1)p^{z-1}\frac{\pi}{T}\}]\right\} =$$

$$\delta_{\beta i}\psi_{\gamma z,i}(\omega_z),$$

wherein:
  $\omega_z$ represents a frequency in the range
  $0 \leq \omega_z < p^{z-1}\pi/T$
  $a_{\gamma z,\alpha\beta}^*$ represents the complex conjugate of $a_{\gamma z,\alpha\beta}$;
  $H_{\gamma z}^{(\alpha)*}(\omega)$ represents the complex conjugate of $H_{\gamma z}^{(\alpha)}(\omega)$ i = 1, 2, 3, ... p;
  $\delta_{\beta i} = 0$ for $\beta \neq i$
  $\delta_{\beta i} = 1$ for $\beta = i$; and
  $\psi_{\gamma z,i}(\omega_z)$ represents an arbitrary function of $\omega_z$.

6. An arrangement for converting a discrete baseband single-sideband frequency-division-multiplex signal $\{y(n)\}$, n = ... −2, −1, 0, +1, +2, ...) having associated therewith a sampling rate $1/T_y$ which is at least equal to N/T, said signal $\{y(n)\}$ being formed by N channel signals and having a frequency spectrum $Y(\omega)$, into N discrete baseband signals $\{x_k(n)\}$, (k = 1, 2, ... N) having associated therewith a sampling rate $1/T$, which baseband signals are representative of said channel signals and which each have a frequency spectrum $X_k(\omega)$, wherein $X_k(\omega_o) = Y[\omega_o + (k-1)\pi/T] \cdot \psi_k(\omega_o)$, wherein the arrangement comprises:
  means for receiving said discrete frequency-division-multiplex signal $\{y(n)\}$;
  a plurality of signal channels to each of which the said discrete frequency-division-multiplex signal $\{y(n)\}$ is applied and which each comprises discrete filtering means and sampling rate reducing means for generating discrete signals $\{s_m(n)\}$, the transfer function of the signal channel being determined by said filtering means and being equal to $E_m(\omega)$;
  a transformation device means to which said discrete signals $\{s_m(n)\}$ are applied and which is arranged for processing these signals for generating a plurality of discrete signals $\{r_k(n)\}$, said transformation device having associated therewith a transformer matrix B comprising the matrix elements $b_{km}$ of a constant value, said transform matrix being unequal to the inverse discrete Fourier transform matrix, and whereby the relationship between the components $s_m(n)$ and the components $r_k(n)$ is given by $$r_k(n) = \sum_{m=1}^{N} b_{km} s_m(n)$$

an output circuit to which the signals $\{r_k(n)\}$ are applied and which is provided with means for selectively modulating the signals $\{r_k(n)\}$ for generating said discrete baseband signals $\{x_k(n)\}$;
wherein for each signal channel the relationship between its transfer function $E_m(\omega)$ and the matrix elements $b_{km}$ is given by the TDM-condition $$\frac{1}{2N}\sum_{m=1}^{N}\left\{b_{km}E_m[\omega_o + (i-1)\frac{\pi}{T}] + \right.$$

$$\left. b_{km}^* E_m^*[\frac{2\pi}{T_y} - \{\omega_o + (i-1)\frac{\pi}{T}\}]\right\} = \delta_{ki}\psi_i(\omega_o),$$

wherein:
  m represents the number of the relevant signal channel;
  $\omega_o$ represents a frequency in the range $0 \leq \omega_o < \pi/T$;
  $b_{km}^*$ represents the complex conjugate of $b_{km}$;
  $E_m^*(\omega)$ represents the complex conjugate of $E_m(\omega)$;
  i = 1, 2, 3, ... N;
  $\delta_{ki} = 0$ for $k \neq i$  $\delta_{ki} = 1$ for $k \neq i$;
  $\psi_i(\omega_o)$ represents an arbitrary function of $\omega_o$.

7. An arrangement for converting a discrete baseband single-sideband frequency division-multiplex signal $\{y(n)\}$, (n = ..., −2, −1, 0 +1, +2, ...) having associated therewith a sampling rate $1/T_y$ which is at least equal to M/T wherein M is an integer, said multiplex signal being formed by N channel signals wherein N is smaller than M and having a frequency spectrum $Y(\omega)$, into N discrete baseband signals $\{x_k(n)\}$, (k = 1, 2, 3, ...N) having associated therewith a sampling rate 1/T, which baseband signals $\{x_k(n)\}$ are representative of said channel signals and which each have a frequency spectrum $X_k(\omega)$ wherein $X_k(\omega_o) = Y\}\omega_1 + \omega_o + (k-1) \pi/T] \cdot \psi_k(\omega_o)$, and wherein $\omega_1 \neq \phi \cdot \pi/T$ where $\phi = 0, +1, \pm 2, \ldots$,
wherein the arrangement comprises:
  means for receiving said frequency-division-multiplex signal $\{y(n)\}$;
  a plurality of signal channels to each of which the discrete frequency-division-multiplex signal $\{y(n)\}$ is applied and which are each provided with discrete filtering means and sampling rate reducing means for generating discrete signals $\{s_m(n)\}$, the transfer function of the signal channel being determined by said filtering means and being equal to $E_m(\omega)$;
  a transformation device means to which said discrete signals $\{s_m(n)\}$ are applied and which is arranged for processing these signals for generating a plurality of discrete signals $\{r_k(n)\}$, said transformation device having associated therewith a transform matrix B comprising the matrix elements $b_{km}$ of a constant value, said transform matrix being unequal to the inverse discrete fourier transform matrix, and whereby the relationship between the components $s_m(n)$ and the components $r_k(n)$ is given by $$r_k(n) = \sum_{m=1}^{N} b_{km} s_m(n)$$

an output circuit to which the signals $\{r_k(n)\}$ are applied and which is provided with a cascade circuit of selective modulation means and complex modulation means with which a complex carrier signal having the frequency $\omega_1/2\pi$ is associated for generating said discrete baseband signals $\{x_k(n)\}$;
wherein for each signal channel the relationship between the transfer function $E_m(\omega)$ and the matrix elements $b_{km}$ is given by the TDM-condition $$E_m^*\left[\frac{2\pi}{T_y} - \left(\omega_1 + \omega_o + (i-1)\frac{\pi}{T}\right)\right] = 0$$

$$\frac{1}{2N} \sum_{m=1}^{N} b_{km} E_m\left[\omega_1 + \omega_o + (i-1)\frac{\pi}{T}\right] = \delta_{ki}\psi_i(\omega_o),$$

wherein:
  m represents the number of the relevant signal channel;
  $\omega_o$ represents a frequency in the range $0 \leq \omega_o < \pi/T$;
  $E_m^*(\omega)$ represents the complex conjugate of $E_m(\omega)$;
  i = 1, 2, 3, ...N;
  $\delta_{ki} = 0$ for $k \neq i$; and
  $\delta_{ki} = 1$ for $k = i$;
  $\psi_i(\omega_o)$ represents an arbitrary function of $\omega_o$.

8. An arrangement as claimed in claim 6, wherein said matrix elements $b_{km}$ are each equal to $\alpha_{km} + j\beta_{km}$, wherein $\alpha_{km}$ and $\beta_{km}$ are constants, each having a value associated with the set of values 0, +1, −1, wherein $j = \sqrt{-1}$.

9. An arrangement as claimed in claim 6, wherein each signal channel comprises a series arrangement of a plurality of sub-channels which are each provided with discrete filtering means and with sampling rate reducing means, and whereby in the $z^{th}$ sub-channel a discrete signal having associated therewith a sampling rate $1/T_z$ is applied to the discrete filtering means.

10. An arrangement as claimed in claim 9, wherein said transformation device comprises a fast transformation device comprising a plurality of transformers each having associated therewith a $p \times p$ sub-matrix $B_{yz}^{(p)} = [b_{yz,\beta\alpha}]$ of a set of $p \times p$ matrixes ($\gamma = 1, 2, 3, \ldots; z = 1, 2, 3, \ldots; \alpha, \beta = 1, 2, 3, \ldots p$) as well as a group of p sub-channels of equal number z and belonging to different signal channels, the discrete filtering means of the sub-channels of number z having the respective transfer functions $E_{\gamma z}^{(j)}(\omega)$ with j = 1, 2, 3, ...p and whereby the relationship between the elements $b_{\gamma z,\beta\alpha}$ and such a transfer function $E_{\gamma z}^{(j)}(\omega)$ is given by the said TDM-condition $$\frac{1}{2N} \sum_{\alpha=1}^{p} \left\{ b_{\gamma z,\beta\alpha} \cdot E_{\gamma z}^{(\alpha)}[\omega_z + (i-1)p^{z-1}\frac{\pi}{T}] + b_{\gamma z,\beta\alpha}^* \cdot E_{\gamma z}^{(\alpha)*}[p^{z+1}\frac{\pi}{T} - \{\omega_z + (i-1)p^{z-1}\frac{\pi}{T}\}] \right\} = \delta_{\beta i}\psi_{\gamma z,i}(\omega_z)$$

wherein:
  $\omega_z$ represents a frequency in the range $0 \leq \omega_z < p^{z-1}\pi/T$;
  $b_{\gamma z,\beta\alpha}^*$ represents the complex conjugate of $b_{\gamma z,\beta\alpha}$
  $E_{\gamma z}^{(\alpha)*}$ represents the complex conjugate of $E_{\gamma z}^{(\alpha)}$;
  i = 1, 2, 3, ... p;
  $\delta_{\beta i} = 0$ for $\beta \neq i$
  $\delta_{\beta i} = 1$ for $\beta = i$; and
  $\psi_{\gamma z,i}(\omega_z)$ represents an arbitrary function of $\omega_z$.

11. An arrangement as claimed in claim 2, wherein said matrix elements $a_{mk}$ are equal to $\alpha_{mk} + j\beta_{mk}$, wherein $\alpha_{mk}$ and $\beta_{mk}$ are constants each having a value belonging to the set of values 0, +1, −1, wherein $j = \sqrt{-1}$.

12. An arrangement as claimed in claim 7, wherein said matrix elements $b_{km}$ are each equal to $\alpha_{km} + j\beta_{km}$, wherein $\alpha_{km}$ and $\beta_{km}$ are constants, each having a value associated with the set of values 0, +1, −1, wherein $j = \sqrt{-1}$.

13. An arrangement as claimed in claim 12 wherein each signal channel comprises a series arrangement of a plurality of sub-channels which are each provided with discrete filtering means with sampling rate reducing means, and whereby in the $z^{th}$ sub-channel a discrete signal having associated therewith a sampling rate $1/T_z$ is applied to the discrete filtering means.

14. An arrangement as claimed in claim 13, wherein said transformation device comprises a fast transformation device comprising a plurality of transformers each having associated therewith a $p \times p$ sub-matrix $B_{\gamma z}^{(p)} = [b_{\gamma z,\beta\alpha}]$ of a set of $p \times p$ matrices ($\gamma = 1, 2, 3, \ldots; z = 1, 2, 3, \ldots; \alpha, \beta = 1, 2, 3, \ldots p$) as well as a group of p sub-channels of equal nimber z and belonging to different signal channels, the discrete filtering means of the sub-channels of number z having the respective transfer functions $E_{\gamma z}^{(j)}(\omega)$ with j = 1, 2, 3, ...p and whereby the relationship between the elements $b_{\gamma z,\beta\alpha}$ and such a transfer function $E_{\gamma Z}^{(j)}(\omega)$ is given by the said TDM-condition $$\frac{1}{2N} \sum_{\alpha=1}^{p} \left\{ b_{\gamma z,\beta\alpha} \cdot E_{\gamma z}^{(\alpha)}[\omega_z + (i-1)p^{z-1}\frac{\pi}{T}] + b_{\gamma z,\beta\alpha}^* \cdot E_{\gamma z}^{(\alpha)*}[p^{z+1}\frac{\pi}{T} - \{\omega_z + (i-1)p^{z-1}\frac{\pi}{T}\}] \right\} = \delta_{\beta i}\psi_{\gamma z,i}(\omega_z)$$

wherein
$\omega_z$ represents a frequency in the range $0 \leq \omega_z < p^{z-1}\pi/T$;
$b_{\gamma z,\beta\alpha}^*$ represents the complex conjugate of $b_{\gamma z,\beta\alpha}$
$E_{\gamma z}^{(\alpha)*}$ represents the complex conjugate of $E_{\gamma z}^{(\alpha)}$;
$i = 1, 2, 3, \ldots p$;
$\delta_{\beta i} = 0$ for $\beta \neq i$
$\delta_{\beta i} = 1$ for $\beta = i$
$\psi_{\gamma z,i}(\omega_z)$ represents an arbitrary function of $\omega_z$.

* * * * *

UNITED STATES PATENT AND TRADEMARK OFFICE
CERTIFICATE OF CORRECTION

PATENT NO. : 4,131,764
DATED : December 26, 1978
INVENTOR(S) : Theodoor S. C. M. Claasen et al.

It is certified that error appears in the above—identified patent and that said Letters Patent is hereby corrected as shown below:

Claim 1, line 7, "1/T" should read -- 1/Ty --.

Claim 2, line 7, "1/T" should read -- 1/Ty --.

Signed and Sealed this

Twenty-third Day of December 1980

[SEAL]

Attest:

SIDNEY A. DIAMOND

Attesting Officer

Commissioner of Patents and Trademarks